(12) United States Patent  (10) Patent No.: US 7,409,441 B2
Kake et al.  (45) Date of Patent: Aug. 5, 2008

(54) DISPLAY APPARATUS FOR ACCESSING DESIRED WEB SITE

(75) Inventors: Tomokazu Kake, Tokyo (JP); Keiso Shimakawa, Kanagawa (JP); Takahiro Fujii, Tokyo (JP); Yuta Kimura, Tokyo (JP); Hidehisa Onai, Tokyo (JP); Yousuke Kimoto, Kanagawa (JP); Kenjiro Komaki, Saitama (JP); Hiromasa Horie, Tokyo (JP); Toyoshi Okada, Tokyo (JP); Shigeru Enomoto, Kanagawa (JP); Muneki Shimada, Tokyo (JP); Shuji Hiramatsu, Tokyo (JP); Masakazu Suzuoki, Tokyo (JP); Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 491 days.

(21) Appl. No.: 10/398,952

(22) PCT Filed: May 17, 2002

(86) PCT No.: PCT/JP02/04821

§ 371 (c)(1),
(2), (4) Date: Oct. 21, 2003

(87) PCT Pub. No.: WO02/095625

PCT Pub. Date: Nov. 28, 2002

(65) Prior Publication Data

US 2004/0054667 A1  Mar. 18, 2004

(30) Foreign Application Priority Data

May 18, 2001 (JP) ............................. 2001-149348
May 14, 2002 (JP) ............................. 2002-139213

(51) Int. Cl.
*G06F 15/173* (2006.01)
(52) U.S. Cl. .................................................... 709/223
(58) Field of Classification Search ................. 709/223, 709/217
See application file for complete search history.

(56) References Cited

U.S. PATENT DOCUMENTS 5,918,237 A * 6/1999 Montalbano ................. 715/513

(Continued)

FOREIGN PATENT DOCUMENTS

EP  0 957 423  11/1999

(Continued)

OTHER PUBLICATIONS

Supplementary Partial European Search Report dated Jun. 27, 2006 for corresponding European Application EP 02 77 1724.

(Continued)

*Primary Examiner*—David Y Eng
(74) *Attorney, Agent, or Firm*—Katten Muchin Rosenman LLP

(57) ABSTRACT

A display apparatus including a communication line connected to a network, an information acquisition device for acquiring in real time at least information relating to a predetermined site on the network via the communication line, the communication line being held by a communication line holding device. The display apparatus includes a display control device for displaying in real time information relating to a plurality of sites acquired by the information acquisition device, and forming symbols corresponding to the plurality of sites, displaying the symbols three-dimensionally in a contrastable state from each other. The information acquired by the information acquisition device is displayed will a symbol, which corresponds to the site, and the information acquisition device acquires at least one of or a plurality of pieces of information indicating congestion status, update status, response, type, popularity, cost, and links of each site, and congestion status of the network.

5 Claims, 17 Drawing Sheets

U.S. PATENT DOCUMENTS

| | | | |
|---|---|---|---|
| 6,008,814 A * | 12/1999 | Baldwin et al. | 345/427 |
| 6,088,707 A | 7/2000 | Bates et al. | |
| 6,115,036 A * | 9/2000 | Yamato et al. | 715/723 |
| 6,147,663 A * | 11/2000 | Smith et al. | 345/2.1 |
| 6,219,032 B1 | 4/2001 | Rosenberg et al. | |
| 6,259,431 B1 * | 7/2001 | Futatsugi et al. | 345/157 |
| 6,362,827 B1 * | 3/2002 | Ohba | 345/572 |
| 6,414,677 B1 * | 7/2002 | Robertson et al. | 345/419 |
| 6,448,670 B1 | 9/2002 | Onodera et al. | |
| 6,470,464 B2 * | 10/2002 | Bertram et al. | 714/37 |
| 6,529,475 B1 * | 3/2003 | Wan et al. | 370/231 |
| 6,574,625 B1 * | 6/2003 | Bates et al. | 707/5 |
| 6,587,127 B1 * | 7/2003 | Leeke et al. | 715/765 |
| 6,722,984 B1 * | 4/2004 | Sweeney et al. | 341/176 |
| 6,959,335 B1 * | 10/2005 | Hayball et al. | 709/227 |
| 7,054,940 B2 * | 5/2006 | Litwin | 709/227 |
| 7,122,751 B1 * | 10/2006 | Anderson et al. | 200/85 R |

FOREIGN PATENT DOCUMENTS

| | | |
|---|---|---|
| JP | 9-26850 A | 1/1997 |
| JP | 10-124295 A | 5/1998 |
| JP | 10-240829 | 9/1998 |
| JP | 11-195027 | 7/1999 |

OTHER PUBLICATIONS

Supplementary European Search Report dated Aug. 18, 2006 for corresponding European Application EP 02 77 172.

* cited by examiner

FIG. 3

NETWORK CONGESTION STATUS: LIGHT

10

| SITE NAME | RESPONSE | LINE SPEED | UPDATE STATUS | CONGESTION STATUS | TYPE | LINKED TO |
|---|---|---|---|---|---|---|
| A | 0.3msec | 1.5Mbps | 70% | 50% | SPORTS | http://www~ |
| B | 0.1msec | 1.5Mbps | 60% | 30% | SPORTS | http://www~ (SEVERED LINK) |
| C | 1msec | 800Kbps | 40% | 10% | MOVIE | http://www~ |
| D | 0.1msec | 1.5Mbps | 30% | 80% | GAMES | http://www~ |
| E | 0.5msec | 64Kbps | 10% | 5% | NEWS | NONE |
| ••• • | •••• | •••• | •••• | •••• | •••• | |

DISPLAY APPARATUS FOR ACCESSING DESIRED WEB SITE

TECHNICAL FIELD

The present invention is related to a display apparatus, which displays by text and images a user's favorite Web site (Bookmarks), a Web site accessed in the past (History), or a Web site searched by a search engine or the like, and a method thereof.

BACKGROUND ART

Presently, diverse Web sites for movies, music, sports, hobbies, news and the like, for example, exist on a network such as the Internet. Through searching and accessing a Web site in accordance with one's own hobbies and desires by initiating a WWW browser (WWW: World Wide Web) of a client terminal apparatus such as a personal computer apparatus, the user gathers information through the use of each of these Web sites in place of a television receiver, radio receiver, or dictionaries or the like.

Here, there is a tendency for accessing times to increase for one's favorite Web site. However, to re-search that Web site for every access and perform input of a Uniform Resource Locator (URL) are a hassle.

Consequently, a bookmarking function is provided to the WWW browser, and saving a Web site name and URL of the favorite Web site using this bookmarking function allows the user to easily access that Web site thereafter.

More specifically, FIG. 23 is a diagram illustrating a WWW browser display screen, however, as can be understood from FIG. 23, Web site names such as, for example, "Freeware", "Graphics", "Glossary of Transmission/Communication Terms", which are saved by the user, are displayed in list form upon the display screen.

The user performs click operation (or double click operation) on the Web site name portion of the display screen using an input device such as, for example, a mouse device, to thereby select a desired Web site from the Web sites, which are displayed in list form.

When detecting this click operation, the personal computer apparatus reads from a storage unit such as a hard disc drive the URL, which corresponds to that click operated Web site, allowing an access to this URL Web site through the WWW browser.

Since the URL of this favorite Web site saved by this bookmarking function remains saved in the storage unit as long as it is not deleted by the user, the user may easily access the favorite Web site any number of times merely by performing the aforementioned click operation.

Here, performing access to the Web site that is saved by the bookmarking function signifies that the access is at least the second time or later, which is often performed for gathering information that could not be gathered during the previous access, or for gathering newly updated information (newly arrived information and the like). However, since a conventional WWW browser only displays in list form the Web site names of the user's favorite Web sites, which are saved by the bookmarking function, there is a problem where access after acquaintance of Web site current conditions such as update status is not possible.

The present invention has come about in consideration of such issues, and the objective thereof is to provide a display apparatus and a displaying method, which allow access to a desired Web site after prior visual perception of network or Web site current conditions.

DISCLOSURE OF THE INVENTION

The present invention displays by associating to a predetermined symbol, information relating to at least a site on a network.

Accordingly, access to a desired Web site after perception of congestion status and the like of each site may be allowed.

BRIEF DESCRIPTION OF DRAWINGS

FIG. 3 is a diagram showing a two-dimensional display example of the above-mentioned bookmark.

BEST MODE FOR CARRYING OUT THE INVENTION

The present invention may be applied to a client terminal apparatus provided with a network linking function, which allows access to Web sites on a network such as, for example, the Internet. With the client terminal apparatus according to embodiments of this present invention, present congestion status of the network and update status of, for example, Web sites saved by a "bookmarking function", Web sites searched by a "search function" or Web sites saved as "History" of Web sites the user has accessed in the past and the like, may be confirmed.

FIRST EMBODIMENT

Structure of the First Embodiment

Figure 1:
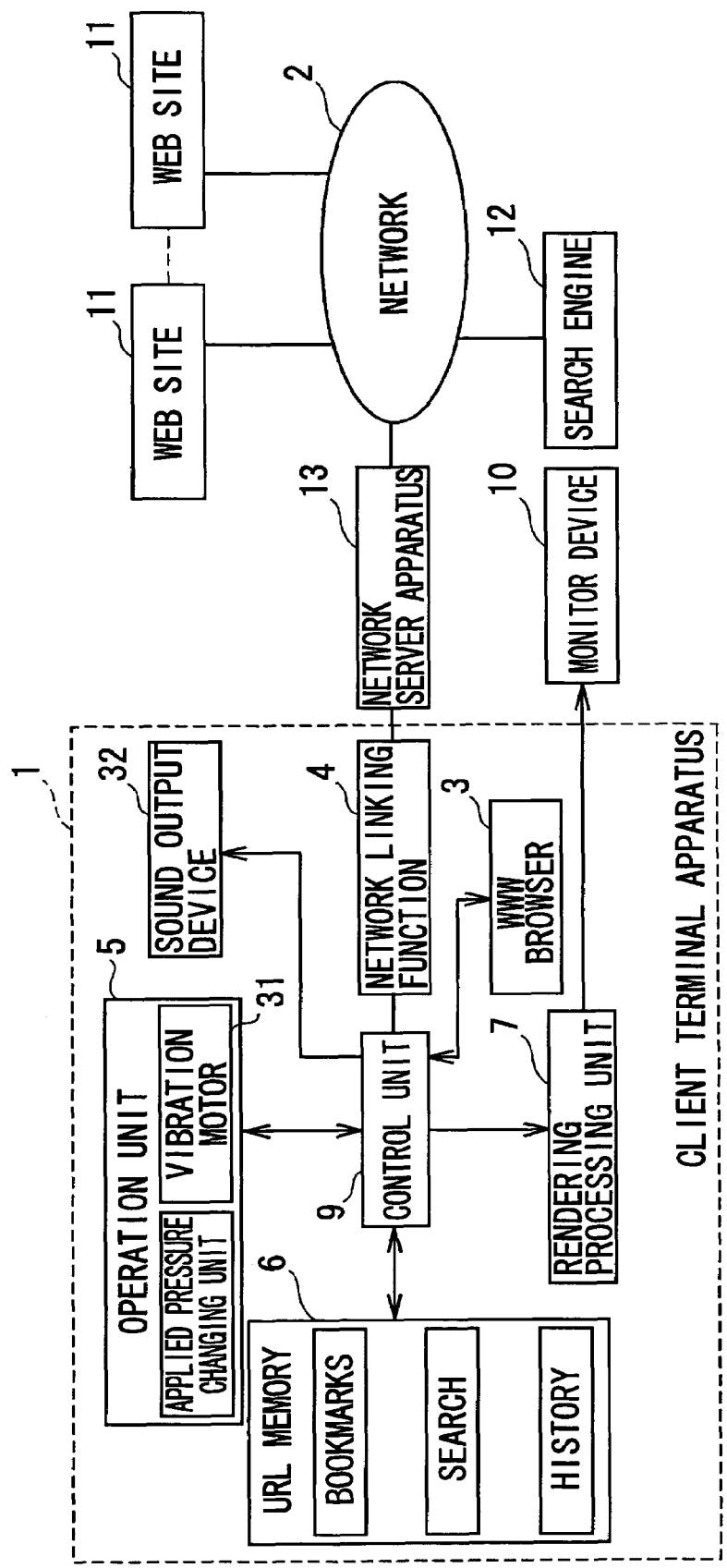
FIG. 1 is a block diagram of a network system including a client terminal apparatus of a first embodiment of the present invention.

Firstly, FIG. 1 is a block diagram of a network system including a client terminal apparatus 1 according to a first embodiment of the present invention. As can be understood from FIG. 1, the client terminal apparatus 1 has a browser 3 (for example, WWW browser) and a network linking function 4 for linking this client terminal apparatus 1 to a network 2, for example, the Internet, and an operation unit 5 which is configured of an input device such as a keyboard, mouse device or the like for performing a predetermined input operation when the client terminal apparatus 1 is linked to the network.

Furthermore, the client terminal apparatus 1 has a URL memory 6, which respectively stores each URL for bookmark attached Web sites, which are the user's favorite Web sites (Bookmarks), Web sites the user has searched by a search engine (Search), and Web sites the user has accessed in the past (History), as well as stores image components such as texture data and object data, which are used when imaging the update status of each of the Web sites or congestion status of the network 2; a rendering processing unit 7, which displays the update status of each of the Web sites in Bookmarks, Search and History stored in this URL memory 6 and the congestion status of the network 2 on a monitor device 10; and a control unit 9, which controls such image rendering processing and link processing to the network 2 and the like.

The network system is configured so that such plurality of client terminal apparatus 1, various Web sites 11, a search engine 12, and a network server apparatus 13 of the network service provider which the user is utilizing are linked to the network 2.

Operation of the First Embodiment

The client terminal apparatus 1 is accessible to the various Web sites 11, the search engine 12 and the like on the network 2. Furthermore, when a desired Web site is specified by the user, the client terminal apparatus 1 records the URL of that Web site in the form of "Bookmarks" in the URL memory 6.

Furthermore, the client terminal apparatus 1 also temporarily stores in this URL memory 6 the URLs of the Web sites searched by the search engine 12. Moreover, the client terminal apparatus 1 stores as "History" in this URL memory 6 URLs of the Web sites the user has accessed in the past.

The client terminal apparatus 1 examines and displays the update status of each of the Web sites in the "Bookmarks", "Search" and "History", which are stored in the URL memory 6, the current congestion status of the network 2 and the like as described in the following.

It should be noted that hereafter, the case of displaying the update status of Web sites, which are stored as "Bookmarks", and the current congestion status of the network and the like are described as an example. Even in the case of Web sites stored as searched Web sites and History, since being similar to this case of Web sites stored as bookmarks, the following description is to be referred.

Two-Dimensional Display

To begin with, the client terminal apparatus 1 may two-dimensionally display by, for example, text and the like, the update status of each of the Web sites 11, which are recorded as "Bookmarks" in the above-mentioned URL memory 6 and the current congestion status of the network.

Figure 2:
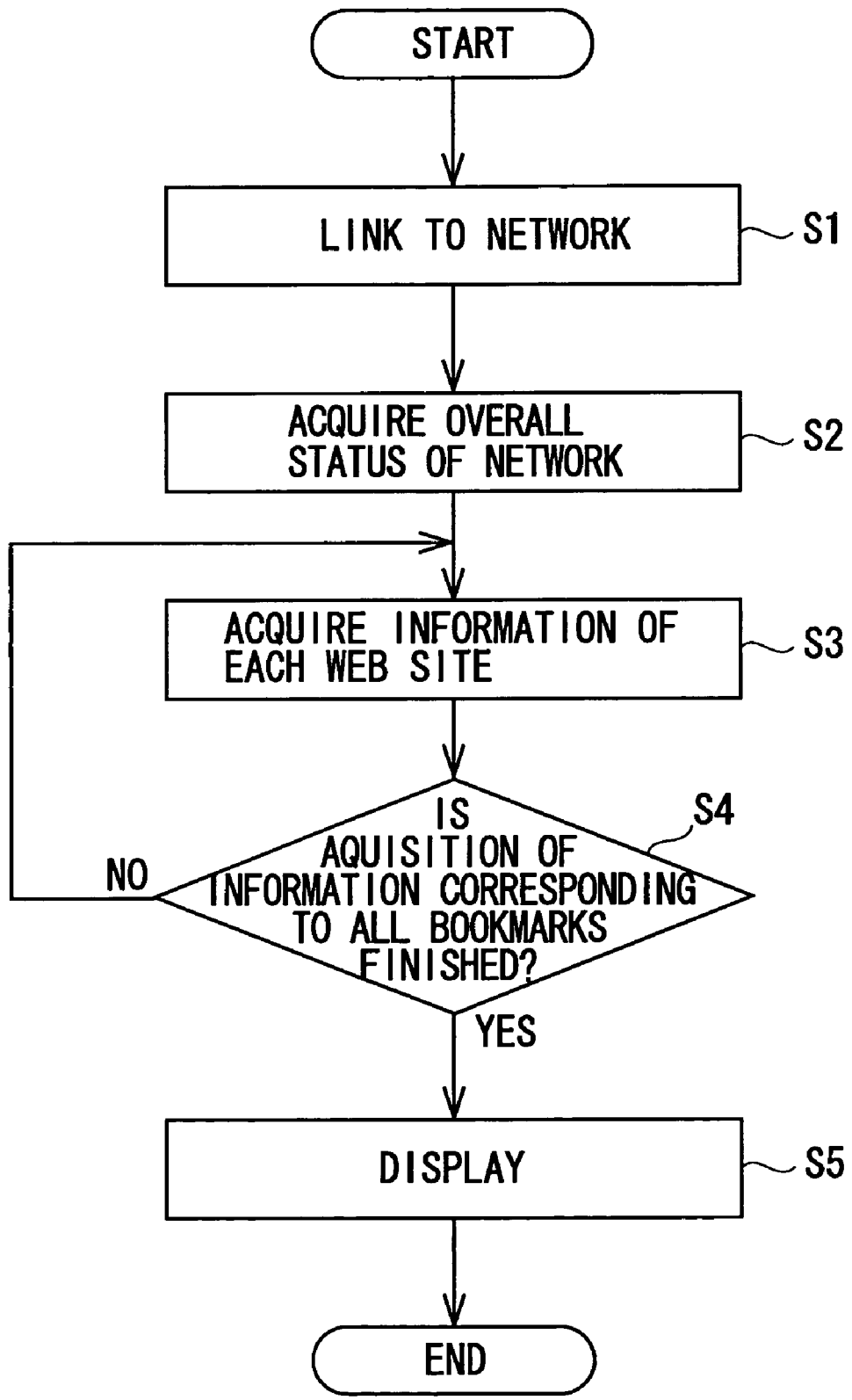
FIG. 2 is a flowchart showing a flow of a two-dimensional displaying procedure of a bookmark in the client terminal apparatus of the first embodiment.

The flowchart of FIG. 2 shows a flow of the display operation for the client terminal apparatus 1 in the case of performing this two-dimensional display. This flowchart starts when the user activates the WWW browser 3 of the client terminal apparatus 1 to specify the two-dimensional display of each of the Web sites 11 that are recorded as "Bookmarks".

First, in step S1, the control unit 9 of the client terminal apparatus 1 controls the network linking function 4 based on the WWW browser 3, thereby to link the client terminal apparatus 1 to the network 2 via the network server apparatus 13 of the network service provider that user is utilizing. Accordingly, this two-dimensional displaying procedure of the "Bookmarks" proceeds to step S2.

In step S2, the control unit 9 of the client terminal apparatus 1 communicates with the network server apparatus 13 via the network linking function 4, to thereby acquire information that indicates the overall status of the network such as line speed and busy status of the network (for example, number of users currently linked to the network server apparatus 13, communication speed between the network server apparatus 13 and the client terminal apparatus 1, and the like).

Next, in step S3, the control unit 9 of the client terminal apparatus 1 reads the URLs of each of the Web sites that are stored as "Bookmarks" in the URL memory 6. Then, the control unit 9 accesses each of the Web sites 11 that are stored as bookmarks to acquire at every Web site 11 information such as responses, update status, congestion status, type and links.

More specifically, the client terminal apparatus 1 acquires information of the above-mentioned responses and congestion status by implementing, for example, a ping for the server apparatus of each of the Web sites 11.

This ping is implemented by using an echo command (=ping command) of the Internet Control Message Protocol (ICMP) The control unit 9 respectively implements the ping for the server apparatus of each of the Web sites 11, which are stored as "Bookmarks". Then, the control unit 9 measures the time period from sending out the echo command to receiving a reply, to thereby detect the measured time as the response of that Web site 11.

Furthermore, the control unit 9 detects as "line speed" the change in communication speed of the communication line. This line speed varies according to availability of the network. This line speed is constantly monitored by the network server apparatus 13. The client terminal apparatus 1 takes in information indicating the current communication speed which the network server apparatus 13 is monitoring, as the above-mentioned line speed.

Furthermore, the control unit 9 has a table wherein congestion status of the Web site 11 are allotted for the above-mentioned measured time periods, for example, 50% congestion for a measured time period of 0.3 m sec., 30% congestion for a measured time period of 0.1 m sec., and the like. The control unit 9, when measuring the time necessary for the echo command to be sent back, detects the congestion status corresponding to this measured time period by referring to the above-mentioned table. Then, the control unit 9 detects the detected congestion status as the congestion status of that Web site 11.

It should be noted that there are cases where the measured time taken for the above-mentioned echo command to be sent back changes according to the distance between the client terminal apparatus 1 and each Web site 11. This may be handled in the following manner.

Namely, the control unit 9 measures and stores the time taken for the echo command to be sent back for every access to each Web site 11. Then, the control unit 9 compares the time of the echo command, which is measured during access to each Web site 11, to be sent back, with the time of the above-mentioned stored last measured echo command to be sent back. Then, the control unit 9 detects the congestion status of each Web site 11 based on the comparison result.

This enables the detection of the congestion status of each Web site based on the time taken for the above-mentioned echo command to be sent back, which is detected during the last access. Therefore even when the distance between the client terminal apparatus 1 and each of the Web sites 11 differs, an approximately accurate congestion status of each Web site 11 can be detected.

Furthermore, the control unit 9 analyzes the Web page acquired from each Web site 11, to thereby acquire the update status, type of each of the Web sites 11, the links from each Web site and the like.

For example, the control unit 9 stores Web page information acquired during the last access and compares the Web page information acquired during the next access therewith, which allows detection the update status of that Web site 11. Furthermore, to detect intervals between previous updates may also result in detection of updating frequency.

Furthermore, if information indicating the update status has been sent from each of the Web sites 11, this may be acquired.

It should be noted that in the case where a "time stamp", which is data recorded with that data's date of creation, is added to the downloaded data of the Web site 11, whether or not an update of that Web site 11 exists may be determined based on this time stamp.

Furthermore, the control unit 9 may detect the URLs of links by detecting the URLs other than the Web site's URL which is embedded into the Web pages of each of the Web sites 11.

Furthermore, a classification processing step for detecting the type of the Web site may be implemented based on the data downloaded from the Web site 11 before and after the above-mentioned step S3.

Next, in step S4, the control unit 9 of the client terminal apparatus 1 determines whether or not acquisition of each of the above pieces of information corresponding to all of the Web sites 11, which are recorded as "Bookmarks" in the URL memory 6, has ended.

In this step S4, when it is determined that acquisition of each of the above pieces of information corresponding to all of the Web sites recorded as "Bookmarks" has not ended, the control unit 9 returns the two-dimensional displaying procedure to step S3 to perform acquisition of each of the above pieces of information of Web sites 11.

On the contrary, when it is determined that acquisition of each of the above pieces of information corresponding to all of the Web sites recorded as "Bookmarks" has ended, the control unit 9 two-dimensionally displays each of the acquired pieces of information in step S5, and concludes this two-dimensional displaying procedure indicated in the flowchart in FIG. 2.

A display example of each of the pieces of information two-dimensionally displayed on the monitor device 10 is shown in FIG. 3. In the case shown in FIG. 3, site names (A, B, C, . . . ), responses (0.3 m sec., 0.1 m sec., . . . ), line speed (1.5 Mbps, 800 kbps, . . . ), update status (70%, 60%, . . . ), congestion status (50%, 30%, . . . ), type (sports, movies, games, . . . ), links (http:/www~, . . . ) and the like of the Web sites are displayed as information of each Web site 11 recorded as Bookmarks.

Furthermore, the network congestion status is displayed in addition to the information regarding these Web sites.

This allows the user to know the network congestion status and the congestion status or update status of that Web site before actual access to the desired Web site. Accordingly, the user may accurately determine whether or not to access before actual access to the desired Web site.

Three-Dimensional Display

To begin with, the client terminal apparatus 1 may three-dimensionally display with, for example, images and the like, the update status of each of the Web sites 11 recorded as "Bookmarks" in the URL memory 6, and the current congestion status of the network.

Figure 4:
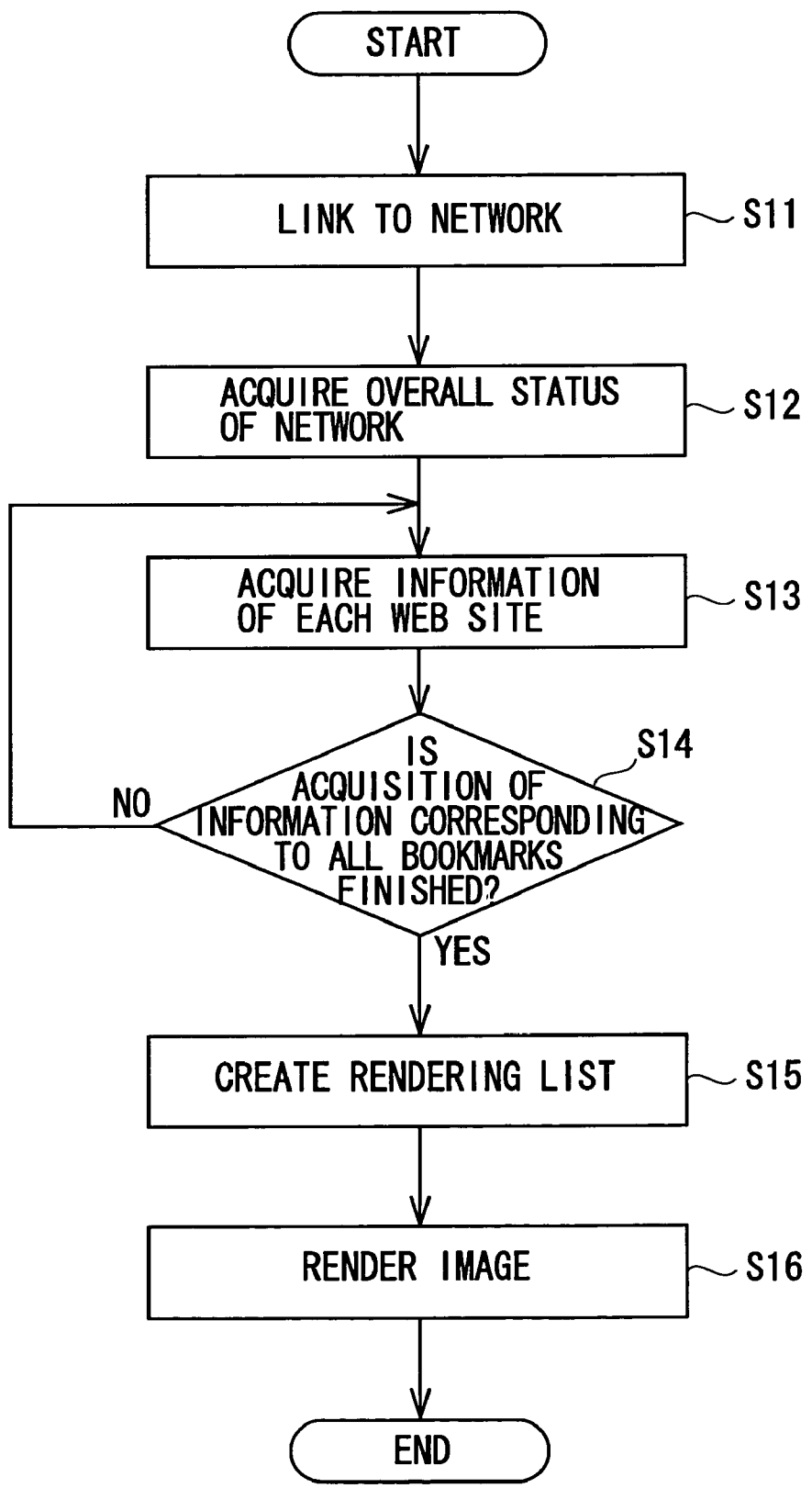
FIG. 4 is a flowchart showing a flow of a three-dimensional displaying procedure of the bookmark in the client terminal apparatus of the first embodiment.

The flowchart of FIG. 4 shows a flow of the display operation for the client terminal apparatus 1 in the case of performing this three-dimensional display. This flowchart starts when the user activates the WWW browser 3 of the client terminal apparatus 1 to specify the three-dimensional display of each of the Web sites 11 which is recorded as "Bookmarks".

To begin with, in step S11, the control unit 9 of the client terminal apparatus 1 controls the network linking function 4 based on the WWW browser 3, to thereby link the client terminal apparatus 1 to the network 2 via the network server apparatus 13 of the network service provider that user is utilizing.

In step S12, the control unit 9 communicates with the network server apparatus 13 via the network linking function 4 to acquire information that indicates the overall status of the network such as line speed and busy status of the network (for example, number of users currently linked to the network server apparatus 13, communication speed between the network server apparatus 13 and the client terminal apparatus 1 and the like).

Next, in step S13, the control unit 9 of the client terminal apparatus 1 reads the URL of each of the Web sites 11 which are stored as "Bookmarks" in the URL memory 6. Then, the control unit 9 accesses each of the Web sites 11 to acquire information of each of the Web sites 11 such as, for example, responses, update status, congestion status, type and links. It should be noted that the acquisition of the pieces of information, as with the case of the two-dimensional display, is performed by implementing a ping or the like for each of the Web sites 11.

Next, in step S14, the control unit 9 determines whether or not acquisition of each of the above pieces of information corresponding to all of the Web sites 11 that are recorded as "Bookmarks" in the URL memory 6, has ended.

In this step S14, when it is determined that acquisition of each of the above pieces of information corresponding to all of the Web sites recorded as "Bookmarks" has not ended, the control unit 9 returns the three-dimensional displaying procedure to the above-mentioned step S13 to perform acquisition of each of the above pieces of information of the respective Web sites 11.

On the contrary, when it is determined that acquisition of each of the above pieces of information corresponding to all of the Web sites recorded as "Bookmarks" has ended, the control unit 9, in step S15, creates a rendering list for executing rendering processing of images based on each bit of information such as the congestion status of the network 2, and the congestion status and update status of each of the Web sites 11, to thereby control to store this rendering list in the URL memory 6.

It should be noted that a classification processing step for detecting the type of that Web site may be implemented based on the data downloaded from the Web site 11 before and after the above-mentioned step S13. The type of each of the Web sites 11 that are detected through this classification processing are recorded in the above-mentioned rendering list.

Finally, the control unit 9, in step S16, forms images which indicate the update status, congestion status and the like of each of the Web sites 11 by controlling a rendering processing unit 7 based on the rendering list stored in the URL memory 6, and conclude this three-dimensional displaying procedure indicated by the flowchart in FIG. 4.

Details of Three-Dimensional Display

Next, the three-dimensional display, which is performed based on the rendering list stored in the URL memory 6, is described in detail. The following example is the one in which the update status of each Web site, congestion status of the network or the like is rendered as building shaped objects.

It should be noted that below, access to each of the Web sites 11 and creation of the rendering list are all performed on the client terminal apparatus 1, and shape data and texture data which are read out and employed as pre-determined patterns, are described as an example.

Figure 5:
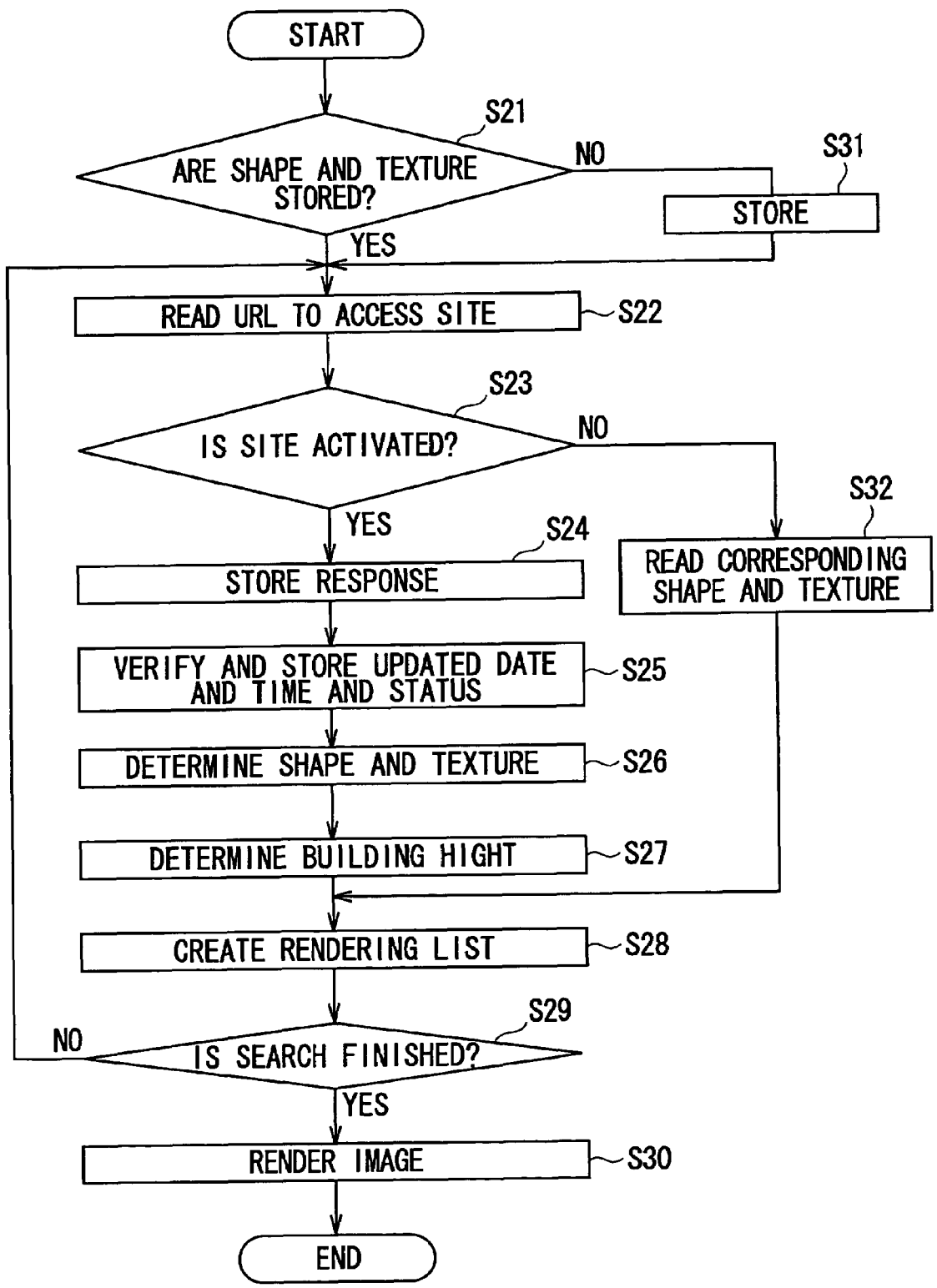
FIG. 5 is a flowchart showing a flow of an image rendering procedure in the three-dimensional displaying procedure of the above-mentioned bookmark.

FIG. 5 is a flowchart showing a flow of a three-dimensional displaying procedure based on the above-mentioned rendering list.

In this flowchart shown in FIG. 5, in step S21, the control unit 9 determines whether or not the shape data and texture data are stored in the URL memory 6. In the case where these data are not stored, in step S31, the control unit 9 downloads via the network, or loads into the client terminal apparatus 1 the shape data and texture data from a storing medium such as an optical disk.

In step S22, the control unit 9 reads each URL stored in the URL memory 6 to successively access each of the Web sites 11 via the network linking function 4.

In step S23, based on the communication status of each of these Web sites 11, the control unit 9 determines whether or not that Web site is active. In the case where it is determined that the Web site is not active, the control unit 9, in step S32, reads from the URL memory 6 "exclusive data when there is no response", such as, for example, "data for displaying a destroyed building", and proceeds this three-dimensional displaying procedure to step S28, which is described later.

In step S24, as the Web site is active, the control unit 9 stores this Web site response in the URL memory 6.

In step S25, the control unit 9 detects the updated date and time and the update status of the Web site to store each of these pieces of information in the URL memory 6.

In step S26, in accordance with the Web site "type" such as, for example, a news site or sports site, the control unit 9 determines the shape data of the building corresponding to that Web site. Furthermore, the control unit 9 determines the texture data of the pattern to be applied to the building of that Web site, in accordance with the "update status" such as, for example, a 20% updated status or an 80% updated status.

In step S27, the control unit 9 determines the height of the building to be rendered in accordance with the Web site response.

In step S28, the control unit 9 creates a rendering list for every Web site according to response, update status or the like, which are detected in the above-mentioned step S24 through step S27, and controls to store the list in the URL memory 6 therewith.

Furthermore, the control unit 9, based on the responses, congestion status and the like, sets the display position of the buildings of each of the Web sites such as, for example, a building of a Web site with a quick response is displayed at a position close to the viewpoint, and a building of a Web site with a slow response is displayed at a position far from the viewpoint, and adds display position information indicating the display position to the above-mentioned rendering list.

In step S29, the control unit 9 determines whether or not searching through all Web sites that are stored as Bookmarks has ended. Then, in the case where searching through all Web sites has not ended, each routine of the aforementioned step S22 through step S28 is repeatedly implemented, and at the timing of when searching through all Web sites has ended is detected in step S29, this three-dimensional displaying procedure proceeds to step S30.

In step S30, the control unit 9, based on the rendering list stored in the URL memory 6, performs rendering processing of the buildings, which represent display position, pattern (color) and height in accordance with the responses, update status and the like of each of the Web sites. Consequently, this three-dimensional displaying procedure indicated in the flowchart of FIG. 5 is concluded.

(Control of Display Position)

Here, the buildings of each Web sites are displayed so as to be arranged in the depth direction from the viewpoint in accordance with the responses, congestion status and the like, however, the user's favorite Web sites must exist among those with bookmarks attached thereto.

In other words, the degree of preference for every Web site differs respectively. When there are such favorite sites (or interested Web sites or the like), the user specifies the Web sites in advance by operating the operation unit 5.

The control unit 9, when this specifying is made, adds to the rendering list display position information which indicates the display position of specified Web sites such that, for example, display position information which makes the display position of the first specified Web site to be the closest position from the viewpoint is added to the rendering list; and display position information which makes the display position of the second specified Web site to be the next closest position from the viewpoint is added to the rendering list.

During image rendering, the control unit 9 performs image rendering by determining the display position for each Web site based on the display position information.

Accordingly, the user's favorite site (or interested Web site or the like) is displayed at an easy-to-see position for the user such as, for example, a position closest from the viewpoint (A noticeable position such as the center of the display screen is also possible.), despite the responses, busy status and the like of the Web site.

As such, displaying the object of the user's favorite Web site near the user allows the user to easily perceive the Web site response and busy status.

Specific Example of Three-Dimensional Display

Figure 6:
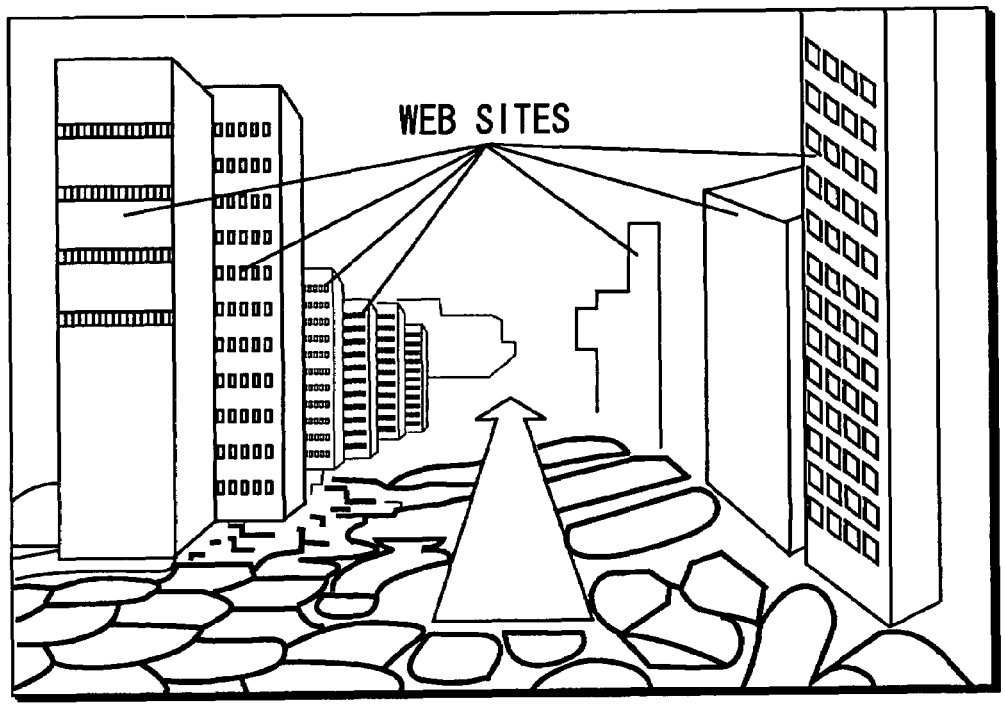
FIG. 6 is a diagram illustrating a display example, which displays each Web site of the bookmarks as building shaped objects.

FIG. 6 is a display example of the case where the update status of each Web site corresponding to the user's "Bookmarks" and the congestion status of the network 2 and the like are displayed on the monitor device 10 as objects in forms of "buildings".

As can be seen from FIG. 6, each of the "buildings", which are objects, indicates each of the Web sites 11 respectively recorded as the user's "Bookmarks". The control unit 9, based on the above-mentioned rendering list, renders a "building" which corresponds to the Web site 11 of a highly congested status due to slow response, popularity, or the like, by arranging at a position far from the viewpoint.

Accordingly, the "buildings" of each of the Web sites 11 on the display screen are respectively displayed at different depths from the viewpoint in accordance with the response and the like of that Web site 11.

It should be noted that in the case where the Web site is specified as the user's favorite site or the like, the building of the Web site is displayed at an easy-to-see position for the user such as, for example, the closest position from the viewpoint, despite the response or busy status or the like, as in the aforementioned case.

(Display of Update Status)

Next, the control unit 9 displays the update status of each of the Web sites 11 by height of the buildings, corresponding to each of the Web sites 11.

More specifically, the Web site 11 that is frequently updated is displayed as a high building, and the Web site 11 that is not updated is displayed as a low building, or all or a portion thereof is destroyed.

Figure 7:
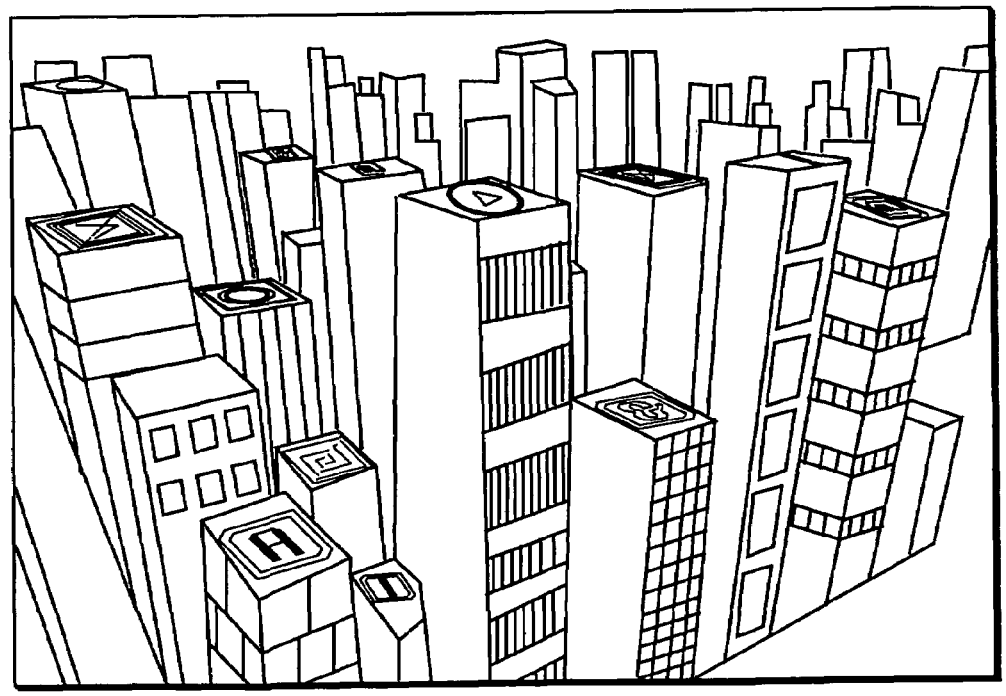
FIG. 7 is a diagram illustrating the buildings of each Web site, which are displayed so that height differs in according to the update status of each Web site 11

FIG. 7 is a diagram of buildings, which correspond to each of the Web sites 11, seen from an upper viewpoint. It can be understood from FIG. 7 that the buildings of each of the Web sites 11 are displayed with the height differing in accordance with the update status. For example, the closest building shown in FIG. 7 is higher than the other buildings, which means that the user may easily perceive that the Web site is frequently updated.

Displaying the buildings by changing the height according to the update status as such allows the user to perceive in a glance an updated Web site from among all the Web sites attached with a bookmark in a glance, and to immediately access the updated Web site.

(Display of Congestion Status)

Next, the control unit 9, in accordance with the congestion status of the Web site 11, displays the building that corresponds to that Web site 11 by changing the pattern (or pattern and color) thereof.

More specifically, each of the Web sites has a plurality of texture data corresponding to respective congestion statuses such as, for example, 00%~30% congestion→Texture A
31%~50% congestion→Texture B
51%~70% congestion→Texture C
71%~90% congestion→Texture D
more than 90% congestion ⇒Texture E.

Each of the Web sites 11 distributes texture data according to the congestion status of that time during examination of each of the Web sites by the client terminal apparatus 1.

The client terminal apparatus 1 downloads the texture data indicating this congestion status and records in the rendering list. Then, during rendering, the client terminal apparatus 1 reads the texture data from the rendering list to perform image rendering by applying the texture data to the building of each of the Web sites.

Figure 8:
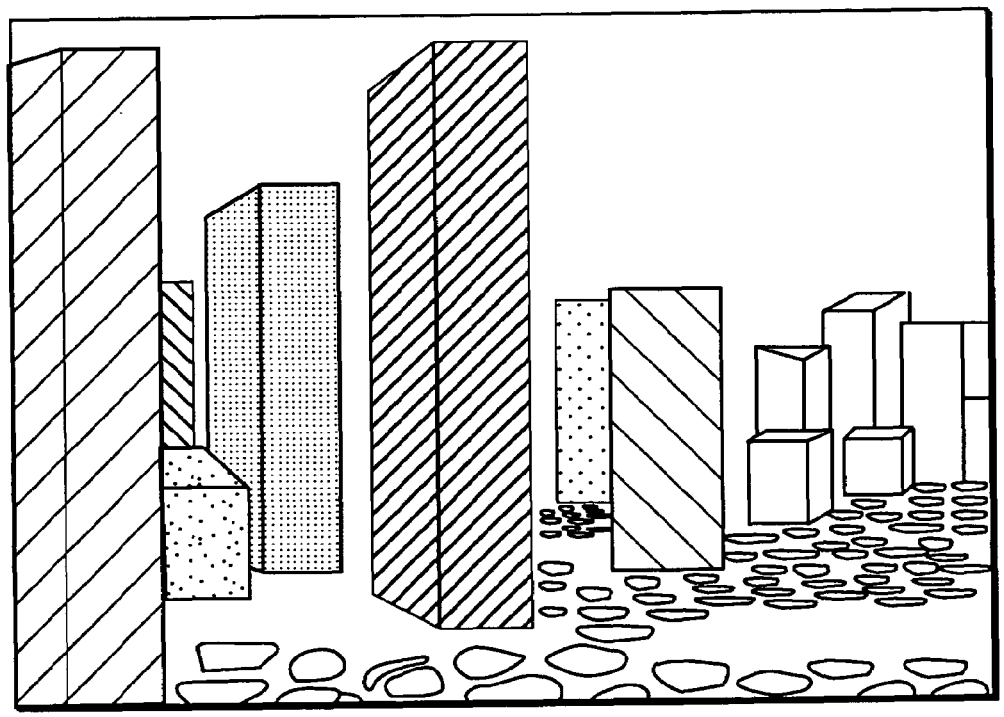
FIG. 8 is a diagram illustrating the buildings of each Web site, which are displayed by patterns according to congestion status.

In FIG. 8, the buildings of each Web site 11 which are rendered by applying texture thereto in accordance with the congestion status, are illustrated. As is clear from FIG. 8, the buildings of each Web site are rendered by applying texture that corresponds to the congestion status of that time, thus becoming patterned (or colored) buildings, which indicate congestion status.

This means that the user may perceive the congestion status of each of the Web sites 11 merely by looking at the patterns (or color) of the displayed buildings of each of the Web sites 11.

It should be noted that respective pattern samples and descriptions of congestion status may be displayed in the remaining regions of the display screen. This enables the user to easily perceive the congestion status of each of the Web sites 11.

(Display of Website Type)

Next, the control unit 9, in accordance with the type of the Web site 11, displays the building corresponding to that Web site 11, by changing the shape thereof.

Figure 9:
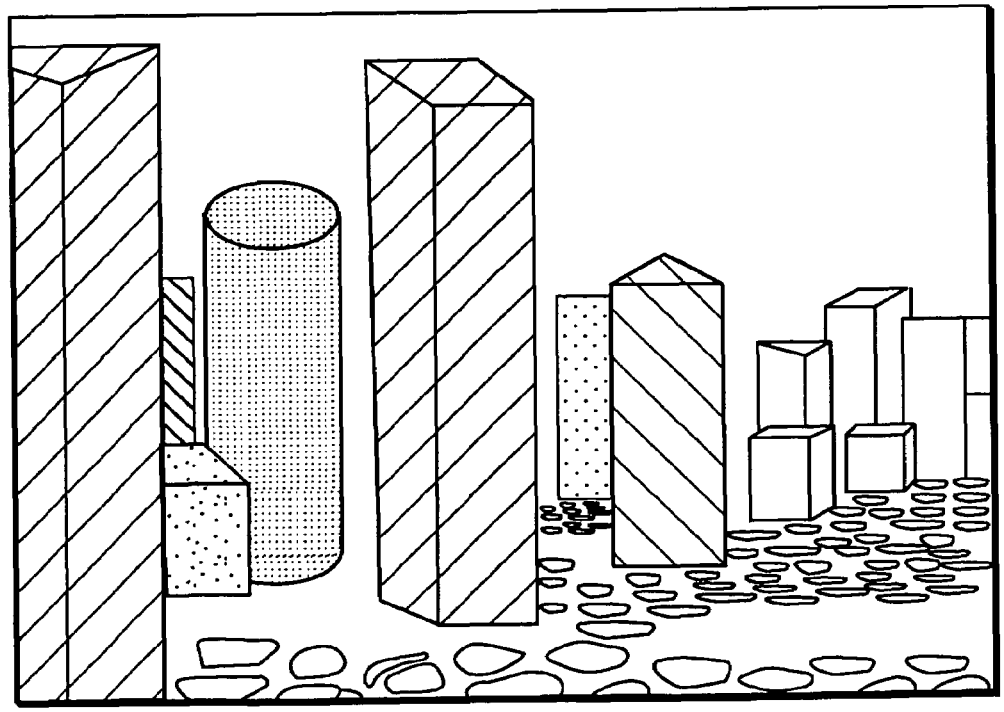
FIG. 9 is a diagram illustrating an example, in which the shapes of buildings are changed according to Web site type when each Web site is displayed as a building image.

FIG. 9 illustrates buildings that are shaped according to the type of each of the Web sites 11. As can be understood from FIG. 9, the control unit 9, for example, displays the shape of that building as a "quadratic prism" shape when that Web site is a Search site, displays the shape of that building as a "triangular prism" shape when that Web site is a News related site, and displays the shape of that building as a "cylinder" shape when that Web site is a game related site.

This means that the user is able to easily determine the type of the Web site corresponding to the building by merely looking at the shape of that building, and that the browser of this network system may be easier to use.

It should be noted that the aforementioned building shapes such as a "quadratic prism", "triangular prism" and "cylinder" are merely an example, where as even with shapes other than these, the buildings of each Web site may be displayed by allotting a desired shape according to the type of each Web site such as a "polygonal prism", for example, a "quadrangular pyramid", "triangular pyramid", "cone", "beheaded cylinder", "beheaded prism", "beheaded cone", and "hexagonal prism" and the like.

Display of Linkage

Next, there are often cases where each of the Web sites 11 places links to other Web sites. The control unit 9 displays the linkage of each of these Web sites 11 within the virtual world, wherein the buildings of each of the Web sites 11 are displayed.

Figure 10:
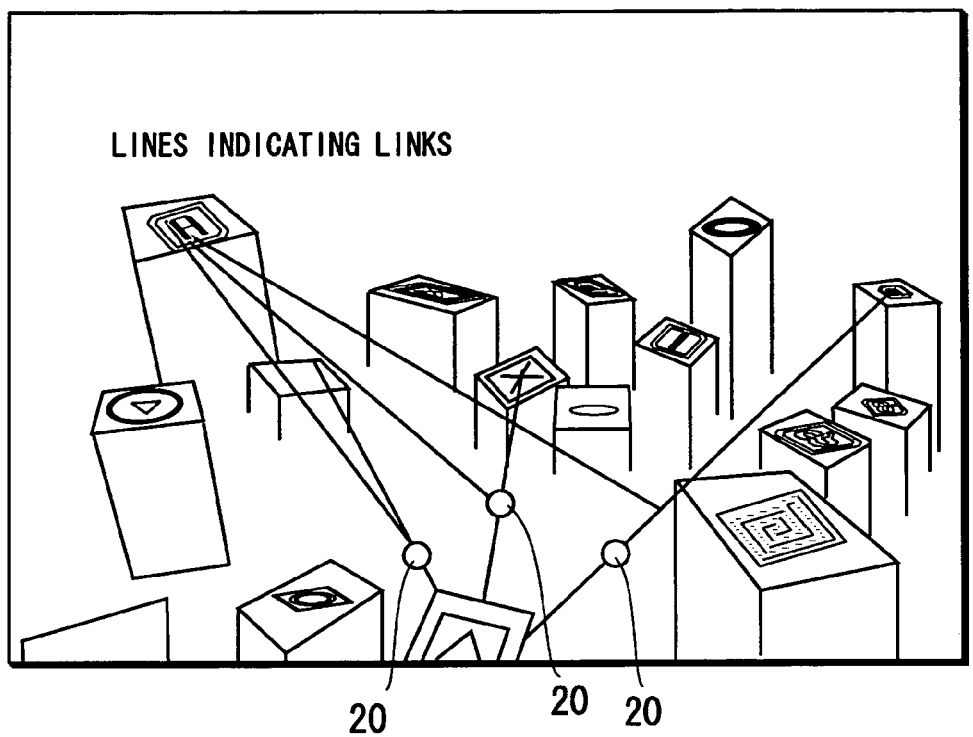
FIG. 10 is a diagram illustrating linkage lines and linkage balls, which express the linkage among each of the Web sites.

In FIG. 10, a display screen whereon the linkage of each of the Web sites 11 is displayed is illustrated as an example. As can be seen from FIG. 10, the linkage of each of the Web sites 11 are displayed by straight lines (linkage lines) which connect the buildings of each of the Web sites in a linkage, and linkage balls 20 which run between each of the buildings along these linkage lines.

When the linkage ball 20 moves along the linkage line and reaches one building, the direction of travel is reversed as if the linkage ball 20 is flipped by this one building, and the operation of proceeding towards the other building always repeatedly performed.

Namely, image-wise, the linkage balls 20 are used for playing catch between each of the buildings.

This allows the user to grasp as far as the linkage of that Web site 11 before access to the desired Web site 11, enabling the user to directly access the Web site which has linkage with the desired Web site 11.

It should be noted that when there are multiple existing Web sites having linkage with that Web site, if the user specifies in advance a displayed linkage as, for example, "display the Web sites of the top three linkages" or the like, the control unit 9 displays only the linkages of the number of Web sites specified by the user. This prevents an inconvenience of the display screen that is complicated with a plurality of linkage lines, and furthermore, the user may perceive only the desired linkage.

Furthermore, in this example, in order to display the linkages of each of the Web sites 11, both the linkage lines and linkage balls 20 are displayed, however, it is alternatively possible to display only the linkage lines or only the linkage balls 20. Even in this case, the linkages of each of the Web sites 11 allows the user to sufficiently perceive.

Furthermore, in the description of this example, the linkage balls 20 go back and forth between the buildings of each of the Web sites. However, the linkage balls 20 may be displayed so as to proceed from the building of the originating Web site towards the building of the Web site of the linkage, disappear once when reaching the building of the Web site of this linkage, and proceed once again from the building of the originating Web site towards the building of the Web site of the linkage.

(Display of Network Line Speed)

Next, the control unit 9 displays the line speed of the network. Since the update status and the like of each of the Web sites 11 is information for every Web site, they are directly displayed to the building shaped objects which represent each of the Web sites. At the same time, the line speed of the network, as information common to all the Web sites 11, is displayed in a manner of affecting all the building shaped objects which represent each of the Web sites as, for example, the weather.

More specifically, the control unit 9 expresses "sunny" weather when the network is available, expresses "cloudy" weather when the network is somewhat congested, and expresses "rainy" weather when the network is congested.

Figure 11:
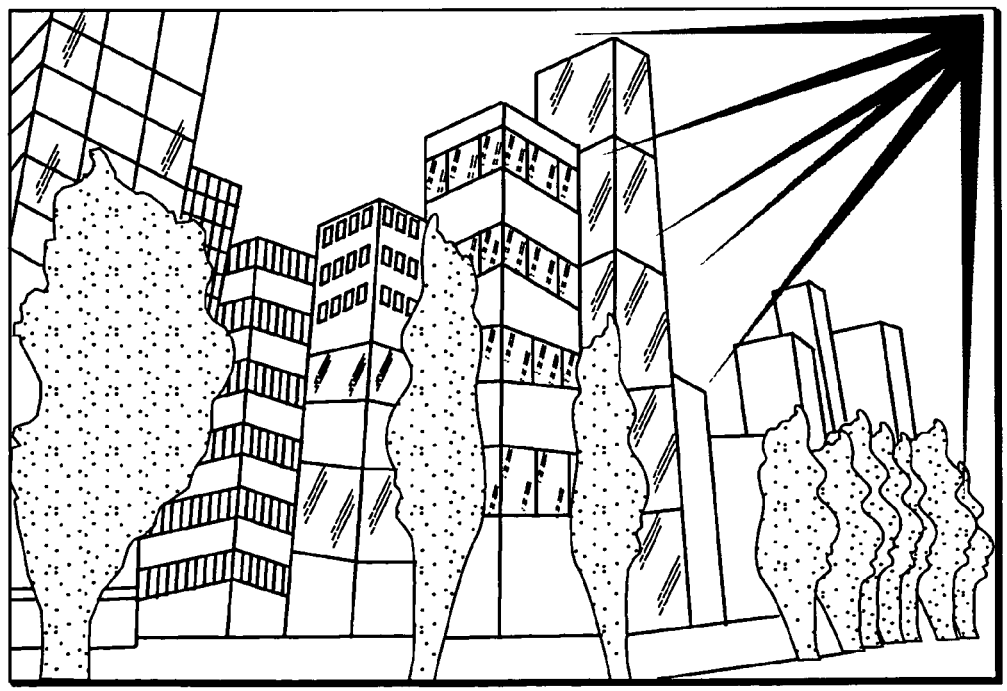
FIG. 11 is a diagram illustrating a display example of daytime within a virtual three-dimensional space wherein the buildings of the above-mentioned Web sites are displayed.
Figure 12:
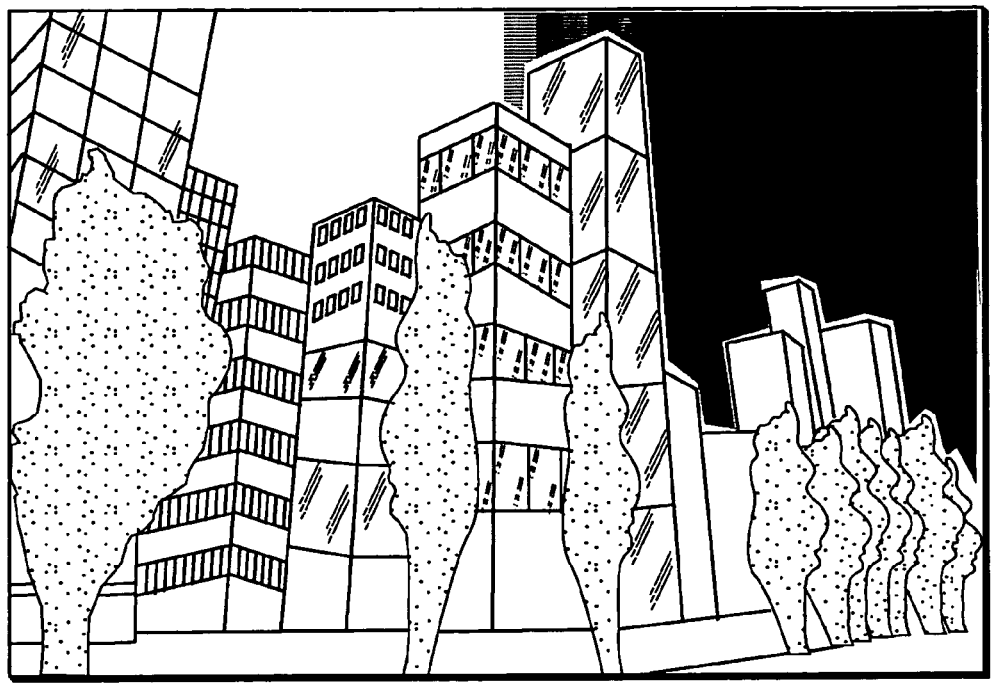
FIG. 12 is a diagram illustrating a display example of nighttime within the virtual three-dimensional space wherein the buildings of the above-mentioned Web sites are displayed.
Figure 13:
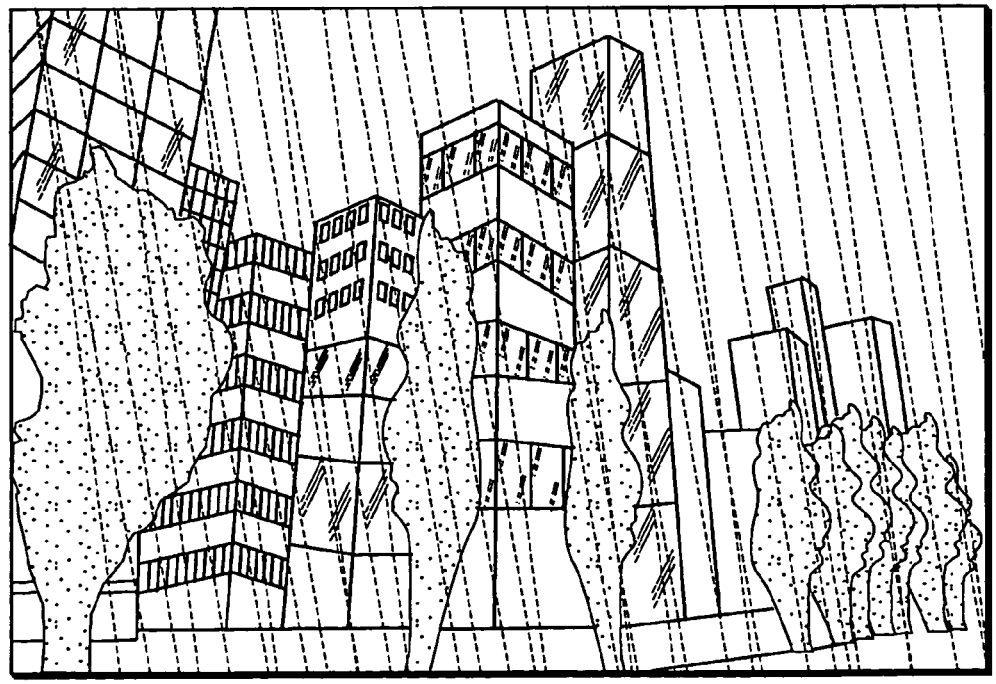
FIG. 13 is a diagram illustrating a daytime virtual three-dimensional space wherein rainy weather that signifies network congestion is displayed.

FIG. 11 illustrates a street of buildings in daytime (sunny) when the network is available; FIG. 12 illustrates a street of buildings at nighttime (cloudy) when the network is somewhat congested; and FIG. 13 illustrates a street of buildings at nighttime (rainy) when the network is congested.

It should be noted that when the season is winter, the whether may be alternatively expressed by "snow", "sleet", "fog" or "hail", instead of "rain".

(Expression of Sense of Seasons)

The control unit 9 detects the time of daybreak and the time of sunset for every season based on date information and time information, to thereby perform image rendering such that the street of buildings corresponds to the seasons or the current time based on these pieces of information.

FIG. 11 illustrates the street of buildings in daytime, which is displayed by the control unit 9 based on the date information and time information, and FIG. 12 illustrates the street of buildings at nighttime.

Since FIG. 11 is a street of buildings in daytime, the buildings of each of the Web sites 11 are displayed as being shined on by the sun; and since FIG. 12 is a street of buildings at nighttime, the respective buildings of each of the Web sites 11 are displayed as being illuminated by the lights of each floor of the buildings, streetlights and the like.

Furthermore, in the case of the examples in FIGS. 11 and 12, by the look of the thickly grown trees, the season is early summer to summer. It should be noted that the control unit 9 expresses the sense of the seasons by performing display of trees bare of leaves, remaining snow or the like when the season is winter.

(Summary of Display Pattern)

To summarize the above described display patterns of the buildings corresponding to each of the Web sites 11,

| | |
|---|---|
| Web site response | → distance from the viewpoint (depth), |
| Line speed (busy status) | → weather, |
| Web site update status | → building height, |
| Web site congestion status | → pattern, |
| Web site type | → shape, |
| Linkage of each Web site | → linkage lines and linkage balls are displayed. |

This allows the user to know the network congestion status and the congestion status or update status and the like of that Web site before actual access to the desired Web site. As a result, the user may accurately determine whether or not to access before actually accessing the desired Web site.

Change Viewpoint

Next, with this client terminal apparatus 1, the viewpoint is changeable by manipulating an operation unit 5 such as, for example, up, down, left and right keys, a mouse device, a tracking ball or joy stick.

When the changing operation of the viewpoint is performed by the user, the control unit 9 detects, for example, coordinate information of the X direction and Y direction that correspond to the operating state of the operation unit 5, and based on this coordinate information, creates a display image representing the viewpoint that corresponds to the operating state of the operation unit 5 so as to display the monitor device 10.

Figure 14:
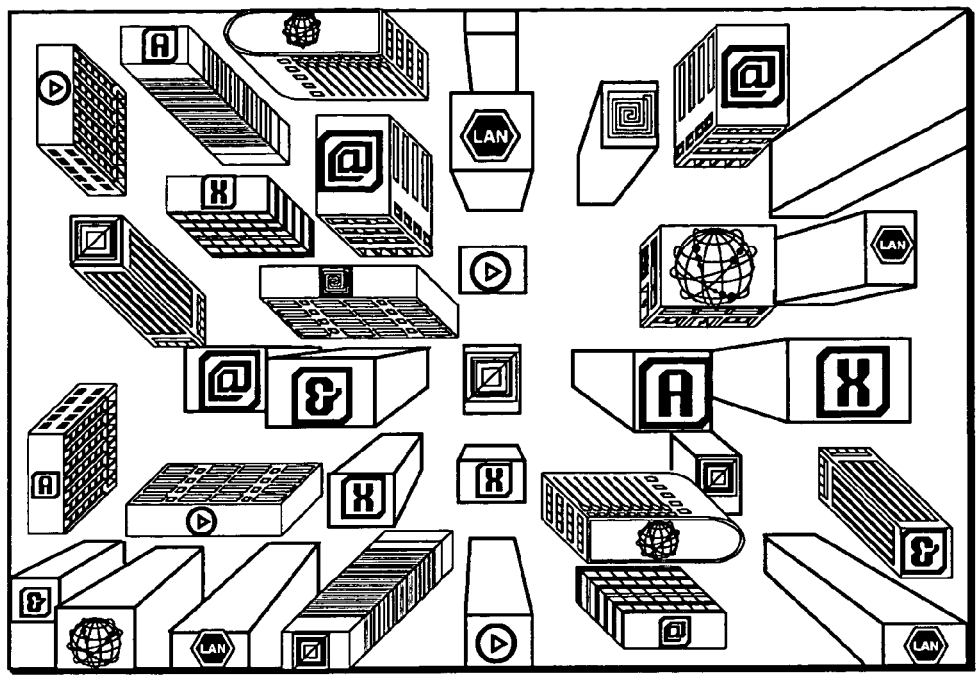
FIG. 14 is a diagram illustrating a display example of the buildings of the above-mentioned Web sites in the case where the viewpoint is shifted to the sky.

FIG. 14 is an example of a displayed image in the case where the viewpoint is shifted to the sky. In the case where the viewpoint is shifted to the sky, it is a displayed image of viewing at a glance the rooftops of the buildings of each of the Web sites, as can be seen from FIG. 14. The portions corresponding to the rooftops of each of the buildings are respectively attached with logos (logos equivalent to icons) of each of the Web sites 11. Consequently, even when the viewpoint is changed as such, the user may perceive at a glance the desired Web site 11.

Furthermore, when a cursor is moved by the user so as to point to the Web site 11, the site name and the like of this pointed Web site 11 is displayed with text such as, for example, "_Search site". Accordingly, even when a site name cannot be known merely from the logo displayed on the rooftop, the site name of that Web site 11 can be perceived by the user.

The client terminal apparatus 1 is able to change the viewpoint, which enables the user to select a desired Web site with sense of moving and taking a stroll on the ground or through the air of the three-dimensional space wherein the buildings of the Web sites 11 are lined up, by changing the viewpoint.

Change Font

Here, as previously mentioned, while the control unit 9 is displaying with text the site name and the like of the pointed Web site 11 such as, for example, "_Search site", the control unit 9 changes the font of the display text in accordance with, for example, the Web site response, Web site congestion status, or network congestion status.

More specifically, the control unit 9 performs text display using, for example, a "Gothic type" font when the pointed Web site is available, and performs text display using, for example, a "Mincho type" font when the pointed Web site is congested. Alternatively, text display is performed using, for example, a "block type" font when the pointed Web site is available, and performs text display using, for example, a "cursive type" font when the pointed Web site is congested.

Accordingly, the font of the text which is displayed in accordance with the Web site congestion status and the like is changed, which allows to the user to perceive the Web site congestion status with this displayed text font.

It should be noted that the exemplified font styles are strictly an example. Thus, font style may be appropriately set according to design and the like.

Pop-up Display of Desired Websites

Next, a plurality of bookmarks creates the display screen jumbled up with buildings of the Web sites 11, which makes it difficult for the user to perceive the desired Web site 11.

Figure 15:
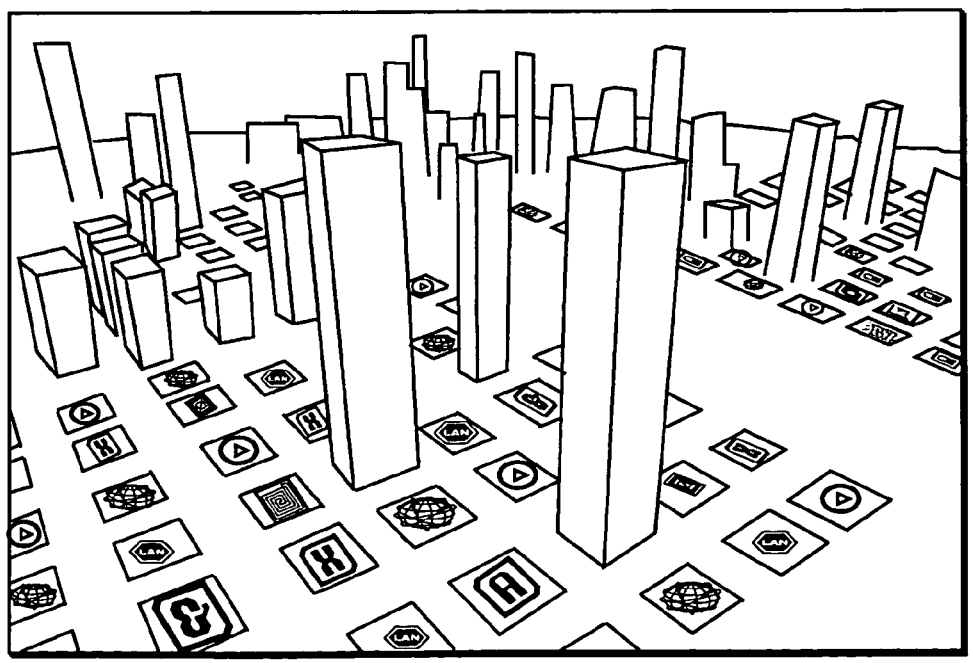
FIG. 15 is a diagram illustrating an example where only the buildings of the desired Web sites are pop-up displayed.

In this case, the user selects bookmarks to be pop-up displayed such as, for example, "Top five bookmarks", "News site bookmarks" and "Music site bookmarks", or selects and specifies a bookmark to be pop-up displayed. Accordingly, the control unit 9 pop-up displays only the building corresponding to the Web site 11 of the bookmark, which is either selected or specified by the user as illustrated in FIG. 15, whereby only the logos of the buildings of the other Web sites 11 are displayed in parallel with the ground.

Accordingly, only the buildings corresponding to the Web sites 11 of the bookmarks, which are selected or specified by the user, may be displayed by being lifted up (be noticeable), making it easier for the user to perceive the desired Web sites 11.

It should be noted that, with Web sites searched by a search engine 12, when display in order from the most recently updated Web site is performed, the number of Web sites to be pop-up displayed may be specified by the user, for example, the "Top four Web sites", "Top six Web sites" and the like. Accordingly, only the closely matching Web sites from among the Web sites, which are searched in the same manner as the aforementioned Bookmarks, may be pop-up displayed.

Furthermore, with Web sites that are stored as History, as with the aforementioned Bookmarks, the number of Web sites 11 to be pop-up displayed may be selected, or the Web site 11 to be pop-up displayed may be specified. This allows pop-up display of only the desired Web site out of the Web sites which make up multiple histories.

Wire Frame Display

Figure 16:
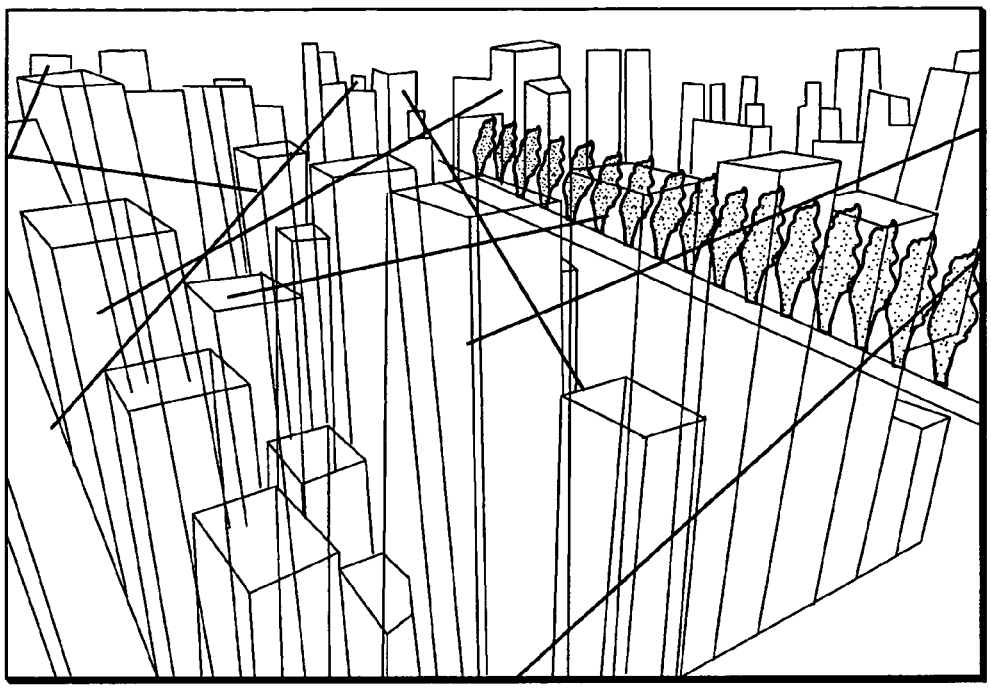
FIG. 16 is a diagram illustrating an example wherein the buildings of each of the Web sites are wire-frame displayed.

Next, this client terminal apparatus 1 is able to wire-frame display in order to make it easier for the user to perceive the positional relationships and linkage of each of the Web sites 11. The user manipulates the operation unit 5 so as to specify this wire-frame display. When this specifying is made, the control unit 9 renders only the edge portions (outline) of the buildings of each of the Web sites 11 as illustrated in FIG. 16.

The buildings of each of the Web sites 11 are then displayed as transparent buildings except for the outer frames, allowing the user to perceive the buildings at a position close to the viewpoint as well as the buildings at a position far from the viewpoint by seeing through each of the buildings. Furthermore, the linkage lines, which link the buildings of each of the Web sites 11, may also be easily perceived.

It is alternatively possible that the desired bookmark may be specified so that only the Web site of that bookmark is normally displayed. In this case, the building of the normally displayed Web site exists among buildings of other Web sites, which are displayed by wire-frames, which makes easier for the user to perceive the desired Web site.

Translucent Display

Figure 17:
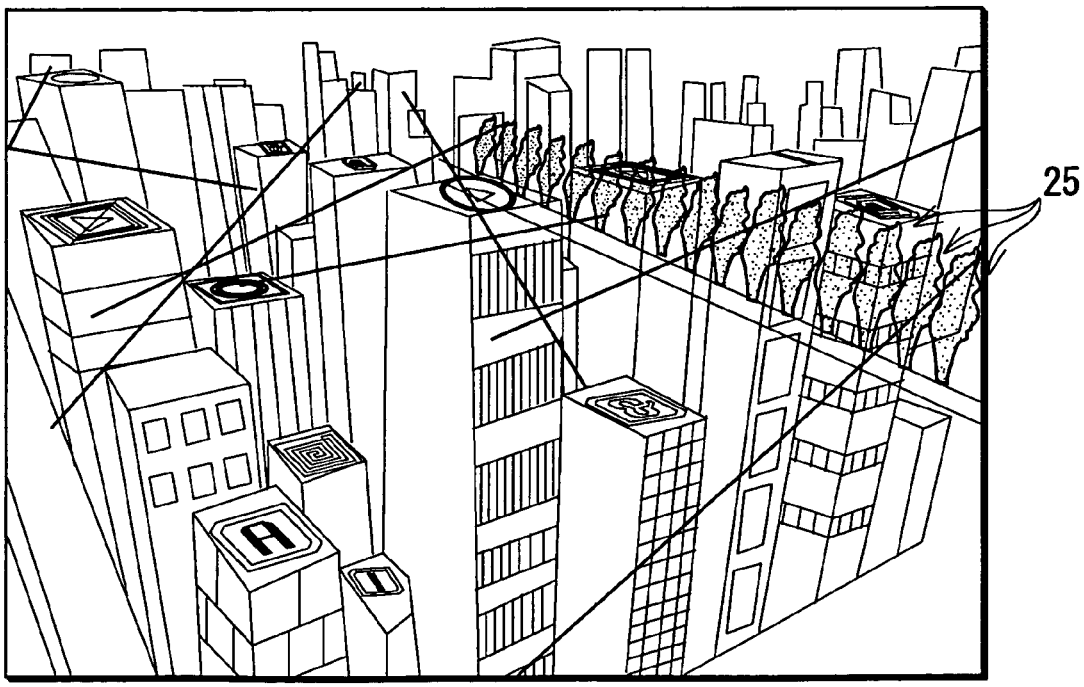
FIG. 17 is a diagram illustrating an example wherein the buildings of each of the Web sites are translucently displayed.

Next, this client terminal apparatus 1 is able to translucently display in order to make it easier for the user to perceive the position relationships and linkage of each of the Web sites 11. The user manipulates the operation unit 5 so as to specify this translucent display. When this specifying is made, the control unit 9 renders by making only the buildings of each of the Web sites 11 translucent as illustrated in FIG. 17. In FIG. 17, trees 25, which are normally hidden in the building's shadow may be perceived by making the buildings translucent.

Similarly to the aforementioned wire-frame display, this allows to the user to perceive the buildings at a position close to the viewpoint as well as the buildings at a position far from the viewpoint by seeing through each of the buildings. Furthermore, the user may perceive the linkage lines which connect the buildings of each of the Web sites 11

It is alternatively possible that the desired bookmark may be specified so that only the Web site of that bookmark is normally displayed. In this case, the building of the normally displayed Web site exists among buildings of other Web sites, which are translucently displayed, which makes it easier for the user to perceive the desired Web site.

Dynamic Display Due to Update of Rendering List

Next, in step S16 of the flowchart shown in FIG. 4 or in step S30 of the flowchart shown in FIG. 5, when the communication line established between the client terminal apparatus 1 and the network server apparatus 13 is disconnected after rendering processing of the image is concluded, update of the rendering list is not performed until both sides reestablish a connection. As a result, the image displayed on the monitor device 10 is a "still image". Even with a still image, the linkage balls 20 that indicate the linkages of each of the Web sites are dynamically displayed as traversing between the buildings of each of the Web sites.

On the contrary, when establishment of the communication line between the client terminal apparatus 1 and the network server apparatus 13 is maintained even after rendering processing of the image is concluded, the rendering list described in step S15 (or step S28) is repeatedly created while this communication line is maintained. Accordingly, since the rendering list is successively updated to the current rendering list, a dynamic image may be displayed on the monitor device 10.

More specifically, in the case where the response of each Web site of the "Bookmarks" gradually and favorably changes, the control unit 9 performs display control such that the display position of that Web site gradually shifts from a position far from the viewpoint to a position close to the viewpoint. The user is able to perceive that the response of that Web site is improving by looking at this building of the Web site which is approaching the viewpoint. Then, by accessing that Web site 11 at an appropriate timing, establishing a connection with this Web site 11 without stress is possible.

Furthermore, in the case where the congestion status of the network (line speed) is gradually cleared, the control unit 9 changes the weather of the three-dimensional space in which the buildings of each of the Web sites are displayed from, for example, "rainy" to "cloudy", and "cloudy" to "sunny". On the contrary, in the case where the network (line speed) gradually becomes congested, the control unit 9 changes the weather of the three-dimensional space in which the buildings of each of the Web sites are displayed from, for example, "sunny" to "cloudy", and "cloudy" to "rainy".

Furthermore, the control unit 9, based on the above-mentioned to-be-updated rendering list, renders an image almost in real time by reflecting the update status of each of the Web sites. Accordingly, an image wherein the height of the building of that Web site changes in accordance with the update status may be provided.

Furthermore, the control unit 9, based on the above-mentioned to-be-updated rendering list, renders an image almost in real time by reflecting the congestion status of each of the Web sites. Accordingly, an image wherein the pattern applied to the building of that Web site changes in accordance with the congestion status may be provided.

Results of the First Embodiment

As is obvious from the above description, the client terminal apparatus 1 of this first embodiment two-dimensionally displays by text the congestion status and update status of each of the Web sites 11 and congestion status of the network 2 and the like, which are recorded as bookmarks or history.

Alternatively, the client terminal apparatus 1 of the first embodiment uses each of the Web sites 11 recorded as bookmarks or history, to resemble objects such as buildings, for example, to vary and display the display position of this building in the depth direction of the display screen in accordance with the congestion status and update status of each of the Web sites 11 and congestion status of the network 2 and the like.

This allows the user to perceive at a glance the congestion status and update status of each of the Web sites 11 and congestion status of the network 2 and the like.

Furthermore, before actually accessing the desired Web site 11, the user may know the current conditions of that Web site 11 or the network, whereby, for example, the user may access under appropriate judgment such as after time has passed when the Web site 11 is congested.

Furthermore, such three-dimensional space wherein objects such as buildings are displayed may be shown by changing the viewpoint thus allowing the user to select the desired Web sites 11 with a sense of strolling through the three-dimensional space.

Furthermore, displaying by linking together with linkage lines the buildings of each of the Web sites that have linkages allows the user to easily perceive the linkages among the Web sites.

Furthermore, implementing "translucent display", "wireframe display" and "pop-up display of only desired buildings" of to-be-displayed objects such as buildings allows the user to easily select desired Web sites from among a plurality of Web sites.

Furthermore, by maintaining the communication line connection between the client terminal apparatus 1 and the network server apparatus 13 even once the image has been displayed, and performing image rendering processing by constantly downloading the latest rendering list (or data indicating update status and the like), the displayed image of the virtual three-dimensional space may be dynamically displayed.

Furthermore, looking from the side of the Web sites 11, since the congestion status and the like of each of the Web sites 11 may be made for the user to perceive, access from the user may be inhibited, enabling to lighten congestion of the network or Web sites.

It should be noted that in the description of the above-mentioned embodiment, congestion status of the Web sites is expressed by patterns of texture, and update status is expressed by height of the to-be-rendered buildings; however, update status of the Web sites may also be expressed by patterns of texture, and the responses may also be expressed by height of the buildings.

In this case, different patterns of texture may be used in accordance with the updated percentage of each of the Web sites 11, such as texture indicating a non-updated site; texture indicating a site that has been updated 1% to 20%; texture indicating a site that has been updated 21% to 40%; texture indicating a site that has been updated 41% to 50%; texture indicating a site that has been updated 51% to 60%; texture indicating a site that has been updated 61% to 80%; and texture indicating a site that has been updated 81% or more.

Furthermore, the shape data and texture data of the buildings which indicate the update status of each of the Web sites, the congestion status of the network and the like may be created independently by each Web site and distributed to the client terminal apparatus 1. In this case, since the shapes and patterns may be independently created for every Web site, recognition of the sites becomes easier, which is an advantage for the user.

Furthermore, a number of predetermined patterns of shape data or texture data may be kept on the side of the computer apparatus which creates the rendering lists for the client terminal apparatus 1, the network server apparatus 13 and the like. In this case, downloading shape data and texture data from each of the Web sites is unnecessary.

SECOND EMBODIMENT

Next, a network system according to the second embodiment of the present invention is described. The above-mentioned first embodiment is the one in which the client terminal apparatus 1 individually accesses each of the Web sites 11 to individually examine current conditions of the network, the current conditions of each of the Web sites and the like, thereby performing two-dimensional display or three-dimensional display based on results of this examination.

The second embodiment is the one in which the network server apparatus 13 of the provider the user is utilizing collectively examines network current conditions, current conditions of each of the Web sites and the like, and each user's client terminal apparatus 1 downloads information such as current conditions of the network and current conditions of each of the Web sites which are examined on this network server apparatus 13, whereby the above-mentioned two-dimensional display or three-dimensional display is performed.

It should be noted that the above-mentioned first embodiment and this second embodiment only differ in this regard. Thus, hereafter, description of only these differences will be made, wherewith duplicate descriptions will be omitted.

Structure of the Second Embodiment

The block diagram of the network system of this second embodiment is the same as that of the network system shown in FIG. 1, however, there is a difference in that each of the pieces of information for displaying the images may be collected by the network server apparatus 13.

Operations of the Second Embodiment

Figure 18:
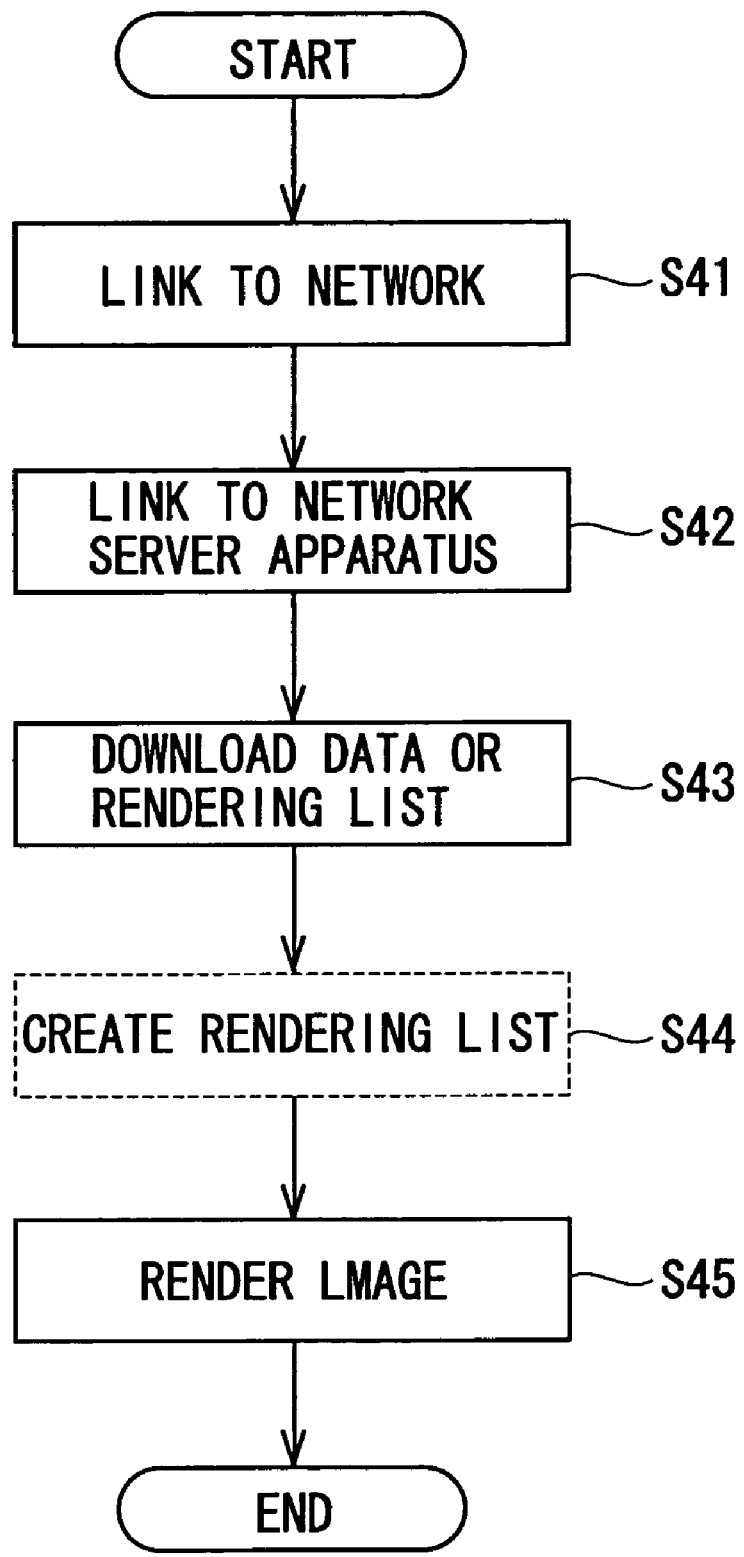
FIG. 18 is a flowchart for describing a flow of a three-dimensional displaying procedure of a network system according to a second embodiment of the present invention.

Hereafter, the flow of a three-dimensional displaying procedure of the network system according to this second embodiment is described using the flowchart shown in FIG. 18. It should be noted that since the case of performing two-dimensional display is also the same, the following description is to be referenced.

This flowchart shown in FIG. 18 starts when the user turns on the main power of the client terminal apparatus 1, this three-dimensional displaying procedure proceeding to step S41.

In step S41, the user links his/her own client terminal apparatus 1 to the network.

In step S42, the user links his/her own client terminal apparatus 1 to the network server apparatus 13.

In step S43, the client terminal apparatus 1 downloads "data" or a "rendering list" indicating current conditions of the network, update status and the like of the Web sites 11 from the network server apparatus 13.

Here, in the case of this second embodiment, there are two methods:

1. the first method, whereby the user pre-records the URL of the desired Web site 11 corresponding to a bookmark on the network server apparatus 13, the network server apparatus 13 constantly or periodically examines the update status and the like of the Web site 11 of that URL, and the user downloads the "data" or "rendering list" of the Web site 11 corresponding to this bookmark from the network server apparatus 13,
2. the second method, whereby the "data" or "rendering list" of current conditions of the network and the update status of the Web site 11 which is recommended by the network server apparatus 13, is downloaded from the network server apparatus 13.

In the case of employing the first method, the client terminal apparatus 1, in step S43, downloads the data or rendering list of update status of the Web sites 11 corresponding to his/her own bookmarks, status of the network and the like.

On the contrary, in the case of employing the second method, the client terminal apparatus 1, in step S43, downloads the data or rendering list of update status of the Web site 11 recommended by the network server apparatus 13 side, status of the network and the like.

Next, when information indicating the update status of the Web site 11, status of the network and the like are downloaded from the network server apparatus 13 in the form of "data", this three-dimensional displaying procedure proceeds to step S44. In step S44, the client terminal apparatus 1, based on the above-mentioned "data" downloaded from the network server apparatus 13, creates a rendering list for rendering the images of the Web site.

It should be noted that when the data which is to be downloaded from the network server apparatus 13, configures only a portion of the rendering list, the client terminal apparatus 1 collects the remaining data so as to supplement the rendering list.

On the contrary, when information indicating the update status of the Web site 11, status of the network and the like are downloaded from the network server apparatus 13 in the form of a "rendering list", this three-dimensional displaying procedure skips the above-mentioned step S44, proceeding to step S45.

In step S45, the client terminal apparatus 1, based on the "rendering list" created in the above-mentioned step S44, or on the "rendering list" downloaded from the network server apparatus 13, renders images of building shaped objects, for example, in the same manner as in the above first embodiment, displaying by

| Web site response | → distance from the viewpoint (depth), |
| Line speed (busy status) | → weather, |
| Web site update status | → building height, |
| Web site congestion status | → pattern, |
| Web site type | → shape, |
| Linkage of each Web site | → linkage lines and linkage balls. |

Accordingly, this three-dimensional displaying procedure concludes.

It should be noted that in the case of this second embodiment, when the communication line between the client terminal apparatus 1 and the network server apparatus 13 is disconnected after such image rendering processing, the image displayed on the monitor device 10 is a still image. Furthermore, the connection on both sides is maintained, and processes from step S41 to step S45 of the flowchart shown in FIG. 18 are repeatedly executed, which allows display of dramatically changing images based on the rendering list continuously updated.

Results of the Second Embodiment

As can be understood from the above description, in the network system of this second embodiment, the network server apparatus 13 collectively examines current status of the network; the update status of the Web site which corresponds to the user's bookmark, or the Web site which the network server apparatus 13 recommends; and the like, whereby the user downloads with the client terminal apparatus 1 to create and display the image.

This allows the user to know the update status of each of the Web sites, the congestion status of the network and the like before access to the desired Web site, whereby the same results as the above-mentioned first embodiment may be obtained.

THIRD EMBODIMENT

Next, a network system according to the third embodiment of the present invention is described. This third embodiment tactilely makes known to the user the status of the network.

Variable Control of Applied Pressure on Operation Units

More specifically, the client terminal apparatus 1 of this embodiment varies the pressure necessary for depressing operation buttons of an operation unit 5 in accordance with Web site responses, congestion status or the network's busy status.

Figure 19:
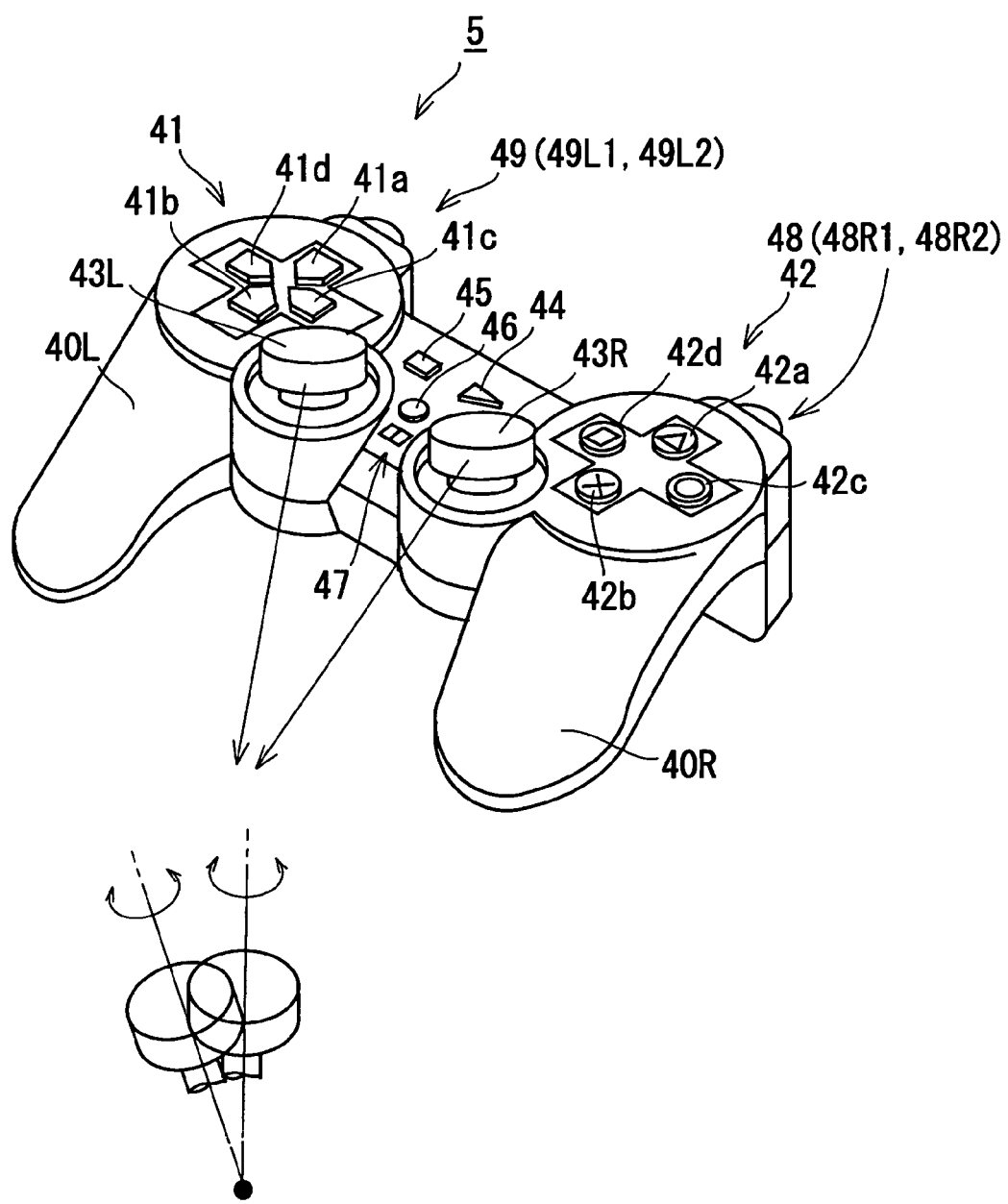
FIG. 19 is a perspective view illustrating the external appearance of a controller, which is connected to the client terminal apparatus.

To begin with, the appearance of the operation unit 5 is shown in FIG. 19. FIG. 19 is an example of when the operation unit 5 is a controller. As is clear from FIG. 19, the operation unit 5 has two grips 40L, 40R, whereby a user holds this operation unit 5 by gripping the respective grips 40L, 40R with the left and right hands.

Furthermore, the operation unit 5 has first and second operation portions 41, 42 and analog operation portions 43L, 43R in the position where such portions are operable by each thumb while each grip 40L, 40R being gripped with the left and right.

The first operation portion 41 is the one for moving operations of the viewpoint or a cursor upon a display screen, for example, and is provided with an upward directional button 41a for commanding an upward direction, a downward directional button 41b for commanding a downward direction, a rightward directional button 41c for commanding a rightward direction, and a leftward directional button 41d for commanding a leftward direction.

The second operation portion 42 is provided with a Δ button 42a having thereon a Δ shaped stamp, a X button 42b having thereon a X shaped stamp, a ○ button 42c having thereon a ○ shaped stamp, and a □ button 42d having thereon a □ shaped stamp.

The analog operation portions 43R, 43L are those for performing the changing operation for the viewpoint or the moving operation for the cursor upon the display screen similarly to the above-mentioned respective upward, downward, rightward and leftward directional buttons 41a to 41d.

The analog operation portions 43R, 43L are designed to keep an upright state (non-inclined state=standard position) and maintain such position while they are not inclined for operation.

When the analog operation portions 43R, 43L are inclined for operation, a coordinate value on an X-Y coordinate according to the amounts of slant and direction with respect to the above-mentioned standard position is supplied to the control unit 9 as operation output.

The control unit 9 forms images based on the viewpoint (in the case of this embodiment, building images of each Web site 11), which corresponds to operation output (coordinate values) of the analog operation portions 43R, 43L and display on the monitor device 10.

Furthermore, this operation unit 5 has a start button 44 for designating the game start; a select button 45 for selecting predetermined items and the like; and a mode selection switch 46 for selecting either analog mode or digital mode. In the case where the analog mode is selected by the mode selection switch 46, a light emitting diode (LED) 47 is controlled to light ON, resulting in the analog operation portions 43R, 43L to be in an operating state; in the case where the digital mode is selected, the light emitting diode 47 is controlled to light OFF, resulting in the analog operation portions 43R, 43L to be in a non-operating state.

Furthermore, the operation unit 5 is provided with a right button 48 and left button 49, for example, in the position where such buttons are operable by the index finger (or middle finger) of each hand while each grip 40R, 40L being gripped with the right and left hands. Each of these buttons 48, 49 has first and second right buttons 48R1, 48R2 and first and second left buttons 49L1, 49L2, which are respectively provided linearly in the thickness direction of the operation unit 5.

When selecting the desired Web site, the user operates the respective upward, downward, leftward and rightward directional buttons 41a to 41d of the first operation portion 41 of the operation unit 5 to thereby change the viewpoint. In addition, the user moves the cursor upon the display screen of the monitor device 10 to the building corresponding to the desired Web site, followed by the depression of the ○ button 42c of the second operation portion 42.

The control unit 9, when detecting that the ○ button 42c has been depressed, reads from a URL memory 6 the Web site URL which corresponds to the building at this cursor position, and supplies to the network linking function 4. Then, the network linking function 4 establishes a communication line with the Web site which corresponds to the URL supplied from this control unit 9. Accordingly, the communication line is established between the client terminal apparatus 1 and the desired Web site for the user, whereby the user is able to access the homepage of this Web site.

Furthermore, the operation unit has a vibration motor, which vibrates the operation unit 5. The vibration motor is driven in accordance with network status and the like.

Configuration of ○ Button

Figure 20A:
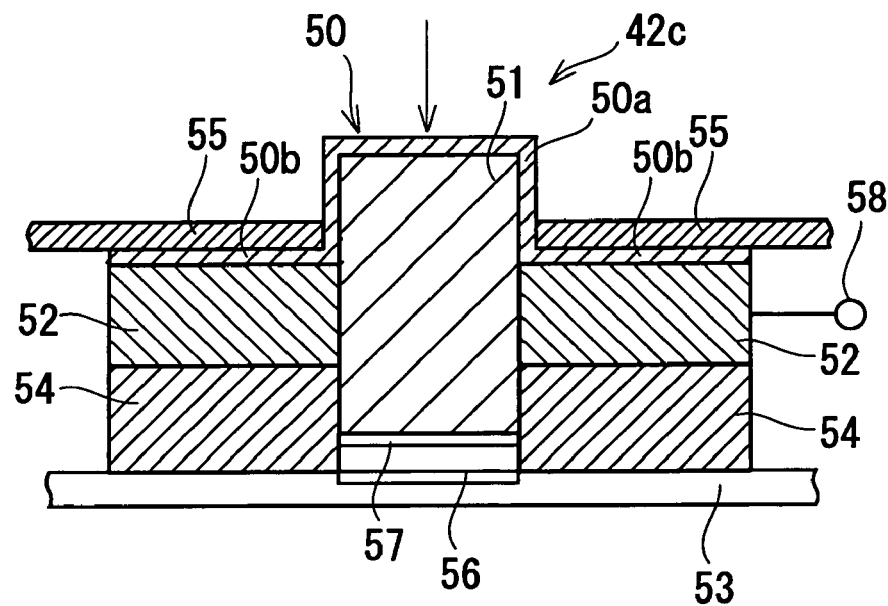
FIG. 20 is profiles showing a ○ button which is provided on the controller, in a non-depressed state, and the ○ button in a depressed state.
Figure 20B:
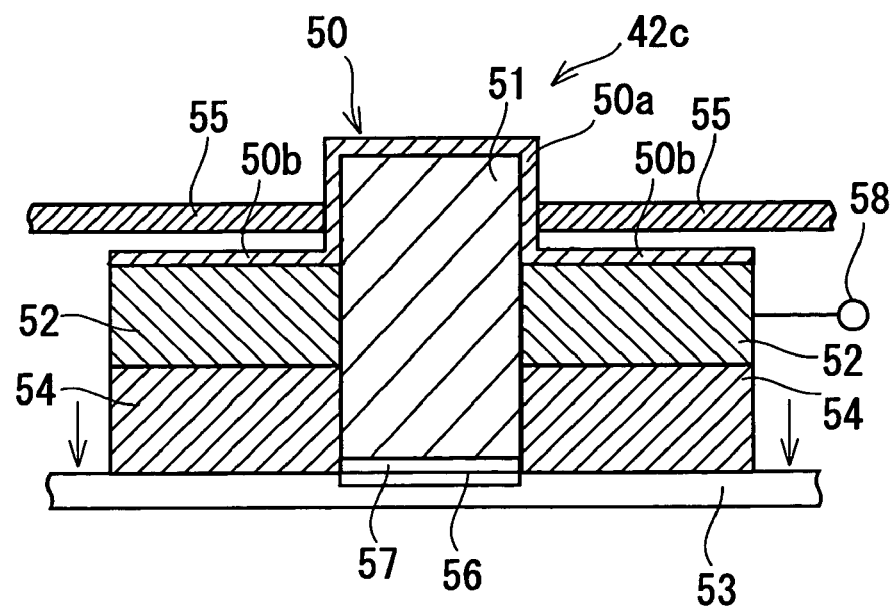

FIGS. 20A and 20B are diagrams of the ○ button 42c cut in a straight line along the height, whereby these cross sections are seen from the front side. As can be understood from FIGS. 20A and 20B, the ○ button 42c has a convex button cover 50; an electrode spacer 51 having a predetermined length which is provided in a form that a portion thereof is buried within the convex button cover 50; a piezo element 52 provided so as to enclose this electrode spacer 51; a substrate 53; and a spacer 54 which is an elastic member such as, for example, rubber or sponge, and is provided so as to fill in the gaps between the piezo element 52 and substrate 53.

The convex button cover 50 is formed of a protruding part 50a and a flange part 50b, wherein the protruding part 50a is provided so that a fixed portion thereof protrudes from a cover 55 of the second operation portion 42.

An electrode 57, which distributes power when making contact with an electrode 56 provided upon the substrate 53, is provided on the electrode spacer 51 on the side opposite to the button cover 50.

The piezo element 52 is connected to the control unit 9 via a voltage applying terminal 58, and changes the thickness in the height direction of the ○ button 42c in accordance with the voltage applied from the control unit 9.

Depressing Operation Under Normal Conditions

In regards to the ○ button 42c having such configuration, FIG. 20A shows a non-depressed state of the ○ button 42c when voltage is not applied to the piezo element 52; and FIG. 20B shows a depressed state of the ○ button 42c when voltage is not applied to the piezo element 52.

As can be understood from FIG. 20A, in the case of the non-depressed state of the ○ button 42c, the electrode 57 which is provided on the electrode spacer 51, does not make contact with the electrode 56 which is provided upon the substrate 53. However, when pressure is applied to the protruding part 50a of the button cover 50 as indicated by the arrow in FIG. 20A, the spacer 54 which is formed of an elastic member is transformed into a crushed shape by the flange part 50b of the button cover 50 via the piezo element 52 as shown in FIG. 20B, and the electrode 57 which is provided on the electrode spacer 51 distributes power by making contact with the electrode 56 which is provided upon the substrate 53.

Variable Control of Force Necessary for Depression

Next, in the case of this client terminal apparatus 1, the congestion status and responses of such as bookmarks, search sites and history of the Web site or the network's busy status are detected as previously mentioned. Here, in the case of a Web site of poor response and a congested Web site, or when the network is congested, it is difficult to access a homepage and the like without stress.

In this example, when the user attempts to select a Web site with poor responses or a congested Web site, or when the network is congested, the control unit 9 applies voltage to the piezo element 52 of the ○ button 42c in accordance with the congestion status and the like of this Web site or network.

Figure 21A:
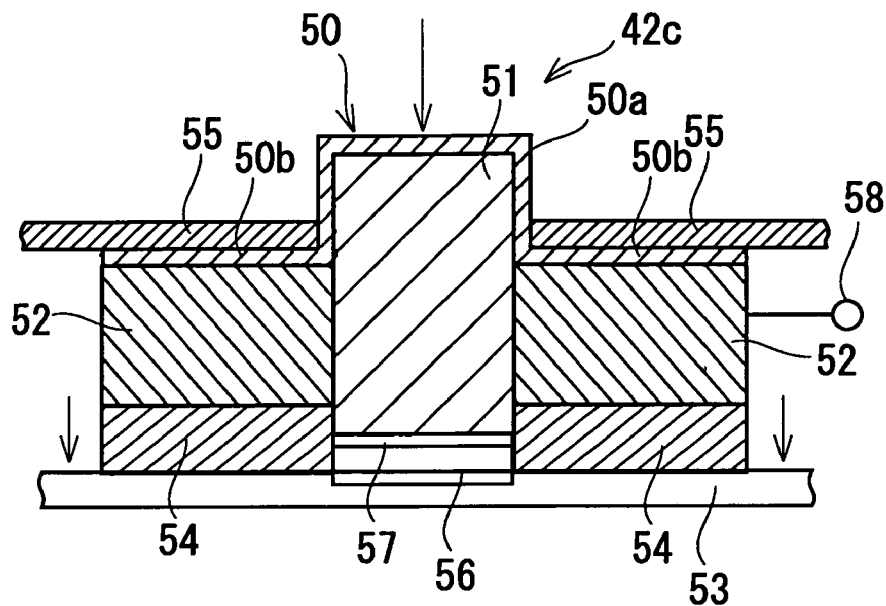
FIG. 21 is profiles showing the state where the thickness of a piezo element has changed as a result of applying voltage to the piezo element, which is provided on the ○ button that is provided on the controller; and the state wherein the force necessary for depressing the ○ button varies as a result of the piezo element.

Next, FIG. 21A shows the condition wherein voltage is applied to the piezo element 52. As can be understood from FIG. 21A, when voltage is applied to the piezo element 52, it is transformed increasing thickness thereof in the height direction of the ◯ button 42c in accordance with this applied voltage. Accordingly, the spacer 54 is crushed and transformed for the equivalence of the increased thickness of this piezo element 52.

It should be noted that since the piezo element 52 and the spacer 54 are respectively provided so as to surround the electrode spacer 51, the electrodes 56, 57 does not make contact with each other just by applying voltage to the piezo element 52.

Figure 21B:
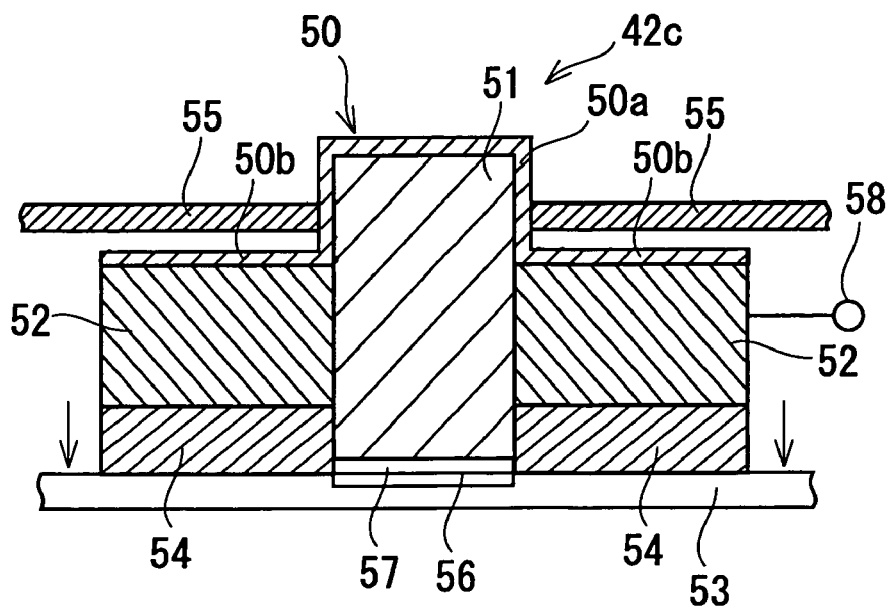

Next, when by the ◯ button 42c is depressed in the state where the spacer 54 is crushed by the piezo element 52, the spacer 54 is transformed so as to be further crushed by the flange part 50b of the button cover 50 via the piezo element 52 as shown in FIG. 21B, whereby the electrodes 56, 57 make contact with each other so as to allow conductance. In this case, before the ◯ button 42c is depressed, the spacer 54 is already crushed by the piezo element 52 for just the voltage applied to the piezo element 52. As a result, in order to depress this ◯ button 42c, more pressure than normal is required.

In other words, since the voltage applied to the piezo element 52 is variably controlled by the control unit 9 depending on Web site responses, Web site congestion status or network congestion status, thickness of the piezo element 52 varies in accordance with the Web site responses, Web site congestion status or network congestion status. Thus, the pressure necessary for depressing the ◯ button 42c varies according to the Web site responses, Web site congestion status or network congestion status.

This allows the user to tactilely perceive the congestion status of the Web site or network when the user depresses the ◯ button 42c, which induces the user to transit to an available Web site. This means lightening of Web site or network congestion and stress-free surfing of the network and the like.

Note that in this case, the pressure necessary for depressing the ◯ button 42c is variably controlled, however, it is alternatively possible that the pressure necessary for depressing the respective upward, downward, rightward and leftward directional buttons 41a to 41d of the first operation portion 41 may be variably controlled, or that the inclined operation pressure necessary for inclining each of the analog operation portions 43R, 43L may also be variably controlled.

Furthermore, this example is in the case of the operation unit 5 as the controller, however, this is the same even if it is the case of an input device such as a keyboard or mouse device. Namely, in the case of the keyboard as the operation unit 5, a pressure variable mechanism such as the above-mentioned piezo element may be provided between the cover of each key and the contact part therewith. Furthermore, in the case of the mouse device as the operation unit 5, by providing a pressure variable mechanism such as the above-mentioned piezo element between the cover of the operation button and the contact part therewith, the same effects may be obtained as in the case of the above controller.

Tactile Control

Figure 22:
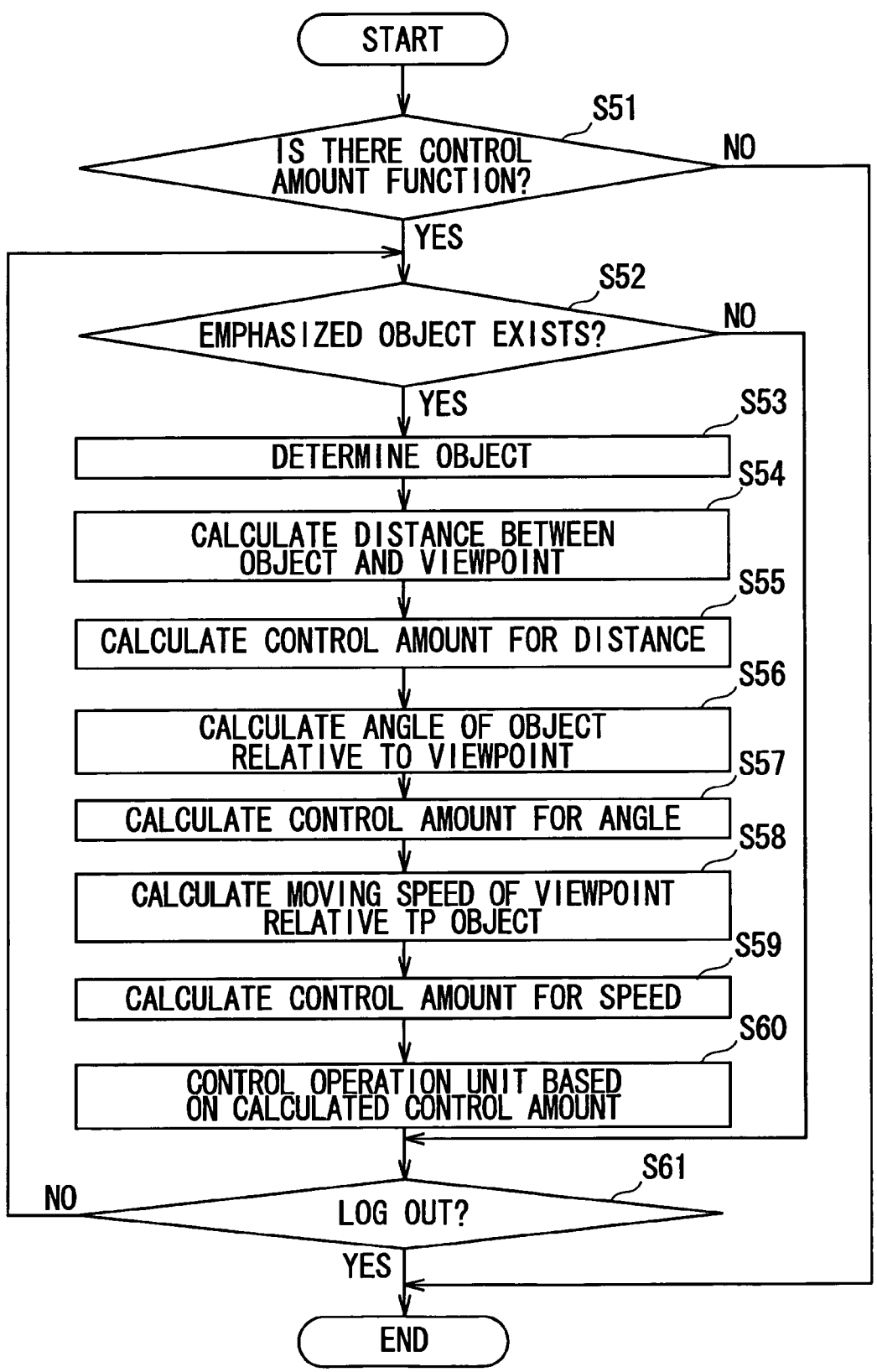
FIG. 22 is a flowchart for describing a flow of a tactilely controlling procedure of a network system according to a third embodiment of the present invention.
Figure 23:
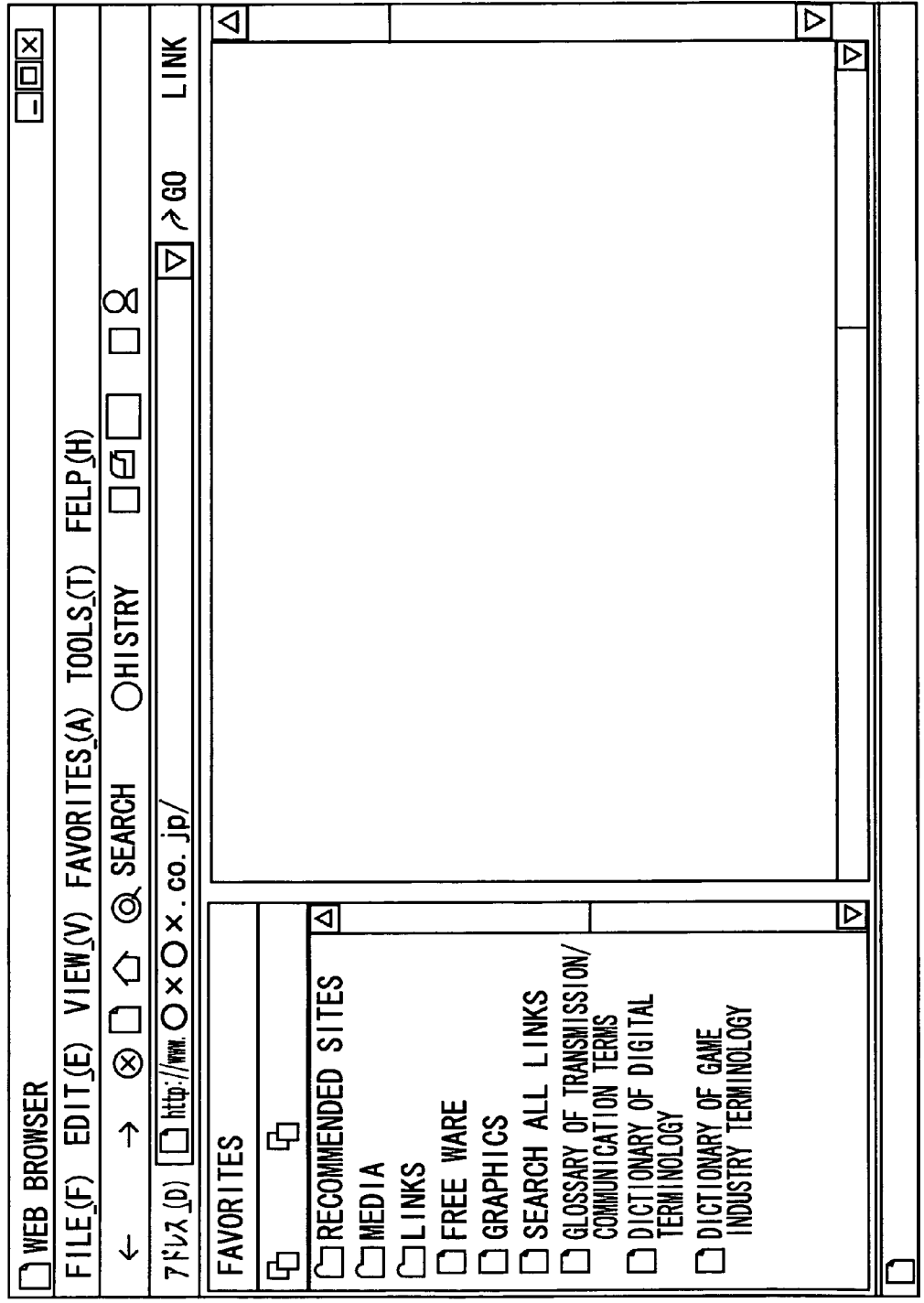
FIG. 23 is a diagram showing a display pattern of bookmarks on a WWW browser of a conventional client terminal apparatus.

Next, a flow of the tactile controlling procedure will be described using the flowchart in FIG. 22. It should be noted that the following describes tactile control, which varies the weight of a "button", and tactile control, which varies the amplitude of a "vibration", are used in combination.

The flowchart starts when the user logs in to a virtual world that is formed by the network system.

In step S51, the control unit 9 communicates with the operation unit 5 to determine whether or not the operation unit 5 has functions corresponding to the tactile control, for example, a function which varies the pressure necessary for depressing a button (a pressure variable function: refer to FIG. 20A, FIG. 20B, FIG. 21A, FIG. 21B), and a vibration function. Then, in the case where it is determined that the operation unit 5 is not provided with the tactile control function, since tactile control can not be performed for that operation unit 5, the control unit 9 ends the implementation of this flowchart.

On the contrary, in the case where it is determined that the operation unit 5 is provided with the tactile control function, since the tactile control for the operation unit 5 is possible, the control unit 9 progresses this tactile control procedure to step S52.

In step S52, the control unit 9 determines whether or not a congested Web site object (a building in the case of this example), is near the transferred position of the user moving within the virtual world. Then, the control unit 9, in the case where a congested Web site object does not exist, progresses this tactile control procedure to step S61; and in the case where a congested Web site object does exist, progresses this tactile control procedure to step S53.

In step S53, the control unit 9 selects, for example, two to four objects which are near the user's transferred position, out of the above objects existing near the user's transferred position. It should be noted that in this case, just the one object nearest to the user's transferred position may be selected.

In step S54, the control unit 9 calculates the distance between the user's viewpoint and each of the above-mentioned objects. In step S55, the control unit 9 calculates the amount of control (vibrating amount of the vibration function, the intensity of pressure necessary for depressing a button and the like) that corresponds to the distance between the user's viewpoint and the objects calculated in the above-mentioned step S54.

In step S56, the control unit 9 respectively calculates the angle of each object with respect to the user's viewpoint. In step S57, the control unit 9 calculates the aforementioned amount of control for the angle detected in the above-mentioned step S56.

In this case, as the above-mentioned angle becomes smaller, the amount of control may gradually be increased. Alternatively, tactile control may be performed when an object exists in a viewing angle, and tactile control may not be performed when an object does not exist in the viewing angle.

In step S58, the control unit 9 calculates the moving speed of the viewpoint with respect to the aforementioned object. In step S59, the control unit 9 calculates the above-mentioned amount of control for the user's moving speed that is calculated in the above-mentioned step S58. In this case, as the moving speed becomes faster, the amount of control gradually increases.

In step S60, the control unit 9, based on the amount of control calculated in the above-mentioned step S54 to step S60, controls the buttons of the operation unit 5 and the vibration function.

More specifically, in this example, with the control amount calculated based upon three elements of the distance, angle, and moving speed, the subsequent distance and the viewing angle are reflected to the vibration amount, and the moving speed is reflected to the weight of the button.

The control unit 9, as the user's transferred position (viewpoint) approaches the above-mentioned object, tactilely controls a vibration motor 31 of the operation unit 5 such that the vibration amount of the operation unit 5 gradually increases; in addition, controls an applied pressure changing unit 30 (for example, the above-mentioned piezo element 52 and the like) of the operation unit 5 such that the pressure necessary for depressing the buttons of the operation unit 5 gradually increases.

Finally, the control unit 9, in step S61, determines whether or not the user has logged out of the virtual world. Then, in the case of not being logged out, the above tactile control is repeated in step S52 to step S60. On the contrary, in the case where the logging out of the user is detected, the implementation of this flowchart concludes.

Effect of the Third Embodiment

In the case of the network system of this third embodiment, network status is visually expressed by building shaped objects, weather objects and the like, and buttons of the operation unit 5 and the vibration motor 31 are controlled according to the network status. This allows the user to visually and tactilely perceive network status, whereby the easier it is to make the user perceive the network status.

Provided that the case where it rains in a virtual town which is formed by rendering buildings and the like corresponding to each of the above-mentioned Web sites, the overall busy status of the network triggers changes in the weather. The lighter the overall load of the network, the better the displayed weather, and inversely, the heavier, the worse the displayed weather. Thus, visual "comfort" and "gloominess" can be provided. Accordingly, the user is able to visually recognize network status.

It should be noted that the operation unit 5 may be controlled in accordance with the overall load of the network. For example, wind is expressed by making trees of the virtual world sway according to the network congestion status, creating conditions such that the wind blows against the user. In addition, making the "buttons" of the operation unit 5 heavier according to the network congestion status makes moving within the virtual world difficult.

Besides network congestion status, the above-mentioned tactile control may be performed in accordance with, for example, the busy status of a specific Web site, activation conditions, or updating amount or the like.

Furthermore, even among the Web sites the user has recorded as "Bookmarks", the user may pre-recorded particular Web sites as, for example, "a Web site not to miss" or "a Web site to check every time", whereby tactile control may be made for that particular Web site alone. In this case, when the particular Web site is congested or is not active due to maintenance or the like, as the user moves within the virtual world and approaches the particular Web site building, the buttons of the operation unit 5 become heavy, making it difficult to approach the particular Web site building.

Furthermore, the vibration motor 31 may be controlled so that the vibration amount of the operation unit 5 increases along with the increase of update amount in the Web site. This allows the user to tactilely perceive the update amount of the Web site.

Furthermore, both tactile control: one that varies the weight of a "button", and one that varies the amplitude of a "vibration", are used in combination, however, either one or the other control may be performed as well.

Furthermore, tactile control which varies the weight of a "button", and tactile control which varies the amplitude of a "vibration", may be selectively used in accordance with every website.

Furthermore, tactile control which varies the weight of a "button", and tactile control which varies the amplitude of a "vibration", may also be selectively used in accordance with the type of Web site.

Moreover, as with the link of site B illustrated in FIG. 3, in the case of a severed linkage, the control unit 5 may be controlled so that the vibration motor 31 is driven to vibrate or the buttons are made to be heavier when the user moves the cursor to the URL displayed area of this link. This allows the user to tactilely know the severed link.

Modified Example of the Third Embodiment

The description mentioned above is the one that visibly and tactilely expresses the current conditions of the network and the like. However, unique sounds (voice, music, beep sounds and the like) may be determined according to each object, and according to the distance between the viewpoint and object or the angle which the object forms with the viewpoint, the above-mentioned sounds may be produced from the sound output device 32 shown in FIG. 1.

For example, the above-mentioned sound output device 32 is controlled so that a large sound is gradually produced as the viewpoint approaches the object; and alternatively, the above-mentioned sound output device 32 is controlled so that a small sound is gradually produced as the viewpoint approaches the object.

Accordingly, the user may visually, tactilely or auditorily perceive the current conditions and the like of the network. Thus, it is easier to make the user perceive the current conditions and the like of the network.

FOURTH EMBODIMENT

Next, a network system according to the fourth embodiment of the present invention is described. Each of the above-mentioned embodiments has been made to two- or three-dimensionally display Web sites corresponding to bookmarks, history and the like. By contrast, this fourth embodiment has been made to two- or three-dimensionally display shopping sites for providing on-line shopping.

Acquire Shopping Site Information

In the case of this fourth embodiment, the network server apparatus 13 is configured to have a plurality of shopping sites, and is designed to provide each user with the information regarding each shopping site as a so-called portal site.

The network server apparatus 13, representing each client terminal apparatus 1, examines the URL, type (type of merchandise being sold over the network such as jewelry, computer supplies and clothing), popularity (accessed count) current line status, and price for each shopping site, and stores these pieces of information in a database to manage them.

The user's client terminal apparatus 1, when this network server apparatus 13 is specified as the portal site, links the client terminal apparatus 1 to the network server apparatus 13 at the beginning, to thereby download information of each of the shopping sites from the above-mentioned database.

Three-Dimensional Display

The client terminal apparatus 1 downloads information regarding each of the above-mentioned Web sites from the network server apparatus 13, for example, to form and display the building-shaped objects that correspond to each of the shopping sites in the same manner as the three-dimensional displaying example of FIG. 14.

More specifically, as merely an example, buildings of each of the shopping sites are displayed as in the following.

| | |
|---|---|
| Popularity | → display position, |
| Availability (availability for accounting) | → weather, |
| Price | → building height, |
| Congestion status | → pattern, |
| Type | → shape, |
| Linkage | → linkage lines and linkage balls (see FIG. 10) are displayed. |

The above "Availability (availability for accounting)" information is information indicating whether or not the accounting server apparatus that each of the shopping sites are utilizing is operating.

Operating of the accounting server apparatus means that business transaction is possible, so that the client terminal apparatus 1 displays, for example, objects of "sunny" weather by overlapping onto the buildings of each of the shopping sites.

On the contrary, non-operating of the accounting server apparatus means that business transactions may not be made, so that the client terminal apparatus 1 displays, for example, objects of "rainy" weather by overlapping onto the buildings of each of the shopping sites.

Thus, display of availability for accounting by using objects of weather allows the user to perceive at a glance whether or not that shopping site is accessible.

It should be noted that when the accounting server apparatus is not operating, the building of that shopping site may be displayed as a "tilted building" or "destroyed building".

The above-mentioned "popularity" information is indicated by the display position of the buildings of each of the shopping sites. More specifically, a highly popular shopping site indicates that it is a shopping site very frequently accessed by users.

Consequently, the client terminal apparatus 1 displays the buildings of each shopping site by setting the display positions according to popularity, such as arranging the building of the most popular shopping site at a position closest to the viewpoint, arranging the building of the second most popular shopping site at a position second closest to the viewpoint, and arranging the building of the third most popular shopping site at a position third closest to the viewpoint.

Accordingly, since the buildings of each of the shopping sites are displayed linearly in order of popularity in the depth direction from the viewpoint, the easier it is to make the user perceive the desired shopping site.

It is alternatively possible that lamps and signs, whereupon popularity is described, may be lit up and displayed so that buildings of highly popular shopping sites or quality shopping sites are more noticeable than other shopping sites.

The above-mentioned "type" information displays the buildings of each of the shopping sites by shape. More specifically, the client terminal apparatus 1, for example, displays a sporting goods shopping site with a triangular prism shaped building, and displays a jewelry shopping site with a cylinder shaped building.

Accordingly, the type of each of the shopping sites may be distinguished by shape of each of the buildings, so that the easier it is to make the user perceive the desired shopping site.

Results of the Fourth Embodiment

As can be understood from the above description, the network system of this fourth embodiment, by displaying for the user the information of each of the shopping sites by objects, is able to make the user perceive at a glance the type, price, congestion status and the like of each of these shopping sites.

As a result, the user may know the profile of that shopping site before actually accessing the desired Web site. Accordingly, for example, when the desired Web site is congested, access may be made under appropriate judgment such as after time has passed.

It should be noted that in the description of this embodiment, information of each shopping site managed by the network server apparatus 13 is downloaded and utilized by the client terminal apparatus 1.

However, the client terminal apparatus 1 stores the URLs of each of the shopping sites in the shape of the aforementioned bookmarks, and when access to the shopping site is specified by the user, the above-mentioned two-dimensional display or three-dimensional display may be performed by acquiring each bit of information of the above-mentioned update status, type and the like from each of the shopping sites based on the stored URLs.

Modified Examples of the First Through Fourth Embodiments

In the above description of the first through fourth embodiments, the example of displaying the congestion status of the network, the update status and congestion status of Web sites or shopping sites and the like as "building" shaped objects, have been described, however, they may be displayed as other objects such as, for example, a "tree" shaped object, "water fountain" shaped object or "vending machine" shaped object.

For example, in the case where the update status of the Web sites and the like are displayed as objects shaped as "trees" or "vending machines", the update status, congestion status and the like may be represented by "height and pattern of the trees" or "height and pattern of the vending machines (Alternatively, it may be the pattern of the packages of drinks and the like on sale.) as the aforementioned.

Furthermore, they may be displayed not only by still life (inanimate matter) objects such as real estate, but also by "animate" objects such as people, characters (characters of games, animation, comics and the like), animals or plants. In the case of using people-shaped objects, the network status, update status and the like may be displayed by height, facial expression, clothes pattern and the like.

Furthermore, in the case of using flower shaped objects, the network congestion status, update status and the like may be displayed by stem length, flower size, flower design and the like. In this case of using the flower shaped objects, visual effects such that the display screen is like a flower garden may be obtained. Then, if the links of each of the Web sites are displayed by the appearance of small birds or insects such as honeybees and butterflies flying back and forth, further visually interesting effects may be obtained.

Moreover, not only may the image be displayed in the air but also undersea or in outer space. In the case of undersea, for example, the update status of the Web site 11 may be displayed by length and patterns of marine plants such as kelp and seaweed, and each of the Web site links may be displayed by the appearance of marine life such as fish, seashells, whales and beetles going back and forth.

Furthermore, in the case of outer space, the update status of the Web site 11 may be displayed by size, patterns and the like of planets, and each of the Web site links may be displayed by the appearance of space ships, imaginary space creatures and the like going back and forth.

Namely, the technical spirit and scope of the present invention consists in displaying by making the arranged position of the objects three-dimensionally arranged different, in accordance with the congestion status of the network 2, the update status of the Web site 11 and the like. Thus, it should be understood that the to-be-displayed objects are those not limited in any way.

In this case, the display positions may be changed according to the busy status and update status of the network such that, for example, the object of the updated Web site and the Web site having an available communication line are displayed at the bottom side of the display screen, and objects of the non-updated Web site and the Web site having dense traffic flow are displayed at the upper side of the display screen, and the like.

It should be noted that regardless of the busy status and update status of the network, the fact that the objects of the Web site specified by the user may be displayed at an easy-to-see position for the user such as, for example, the upper side of the display screen, is the same as in each of the above-mentioned embodiments.

Finally, the present invention is not meant to be limited in any way by the embodiments described above by way of example; it is also appended herein that even if there are additional embodiments besides those mentioned above, various modifications thereto according to design and such can be naturally made without deviating from the technical spirit and scope of the present invention.

INDUSTRIAL APPLICABILITY

The present invention may be applied to a client terminal apparatus provided with a network linking function, which allows an access to Web sites upon a network such as, for example, the Internet.

The invention claimed is:

1. A display apparatus comprising:
a communication line connected to a network;
an information acquisition arrangement for acquiring in real time at least information relating to a predetermined site on the network via the communication line, said communication line being held by a communication line holding arrangement;
a display control arrangement for displaying in real time information relating to a plurality of sites acquired by the information acquisition arrangement, forming symbols corresponding to the plurality of sites, displaying the symbols three-dimensionally in a contrastable state from each other and displaying the information acquired by the information acquisition arrangement with a symbol which corresponds to the site;
an operation arrangement in communication with the display control arrangement and for directing an operator by a user, the operator being displayed along with the information or the symbol by the display control arrangement, and
a control arrangement for performing any one of or a plurality of controls, the controls including:
a control for changing force necessary for operating the operation arrangement;
a control for driving a vibration arrangement provided to the operation arrangement; and
a control for producing a predetermined sound, when the operator approaches the predetermined information or the symbol, wherein
the information acquisition arrangement acquires at least one of or a plurality of pieces of information indicating update status, response, type, popularity, cost, and links of each site.

2. The display apparatus according to claim 1, wherein the information acquisition arrangement further acquires at least one of information indicating congestion status of each site and information indicating congestion status of the network.

3. The display apparatus according to claim 2, wherein the display control arrangement forms a symbol indicating congestion status of the network and displays the congestion status symbol in an overlapping fashion with the symbols of the plurality of sites.

4. A displaying method comprising:
a step of connecting a communication line to a network;
a step of holding the communication line connected;
a step of acquiring in real time at least information relating to a predetermined site on the network via the communication line being held connected;
a step of displaying in real time the acquired information relating to each site by associating the information with a symbol which corresponds to the site,
a step of communicating with a display control arrangement by an operation arrangement;
a step of directing an operator by a user, the operator being displayed along with the information or the symbol by the display control arrangement, and
a step for performing any one of a plurality of controls, the controls including:
a control for changing force necessary for operating the operation arrangement;
a control for driving a vibration arrangement provided to the operation arrangement; and
a control for producing a predetermined sound, when the operator approaches the predetermined information or the symbol, wherein
the information relating to the predetermined site on the network includes at least one of or a plurality of pieces of information indicating update status, response, type, popularity, cost, and links of each site.

5. The displaying method according to claim 4, wherein the information relating to the predetermined site on the network includes at least one of information indicating congestion status of each site and information indicating congestion status of the network.

* * * * *